(12) United States Patent
Heiges et al.

(10) Patent No.: US 7,698,194 B2
(45) Date of Patent: Apr. 13, 2010

(54) TECHNIQUES FOR ILLUSTRATING AND ANALYZING COLLEGE SAVINGS PLANS

(75) Inventors: Andrew R. Heiges, Doylestown, PA (US); Robert Kron, Franklin Park, NJ (US); Steve Monical, Monmouth Junction, NJ (US)

(73) Assignee: Merrill Lynch Co., Inc., New York, NY (US)

( * ) Notice: Subject to any disclaimer, the term of this patent is extended or adjusted under 35 U.S.C. 154(b) by 831 days.

(21) Appl. No.: 10/751,331

(22) Filed: Jan. 2, 2004

(65) Prior Publication Data

US 2004/0236652 A1 Nov. 25, 2004

Related U.S. Application Data

(63) Continuation of application No. 09/620,452, filed on Jul. 20, 2000, now abandoned.

(51) Int. Cl.
*G06Q 40/00* (2006.01)
(52) U.S. Cl. .................. 705/36 T; 705/35
(58) Field of Classification Search ........ 705/36 R, 705/35–36 T
See application file for complete search history.

(56) References Cited

U.S. PATENT DOCUMENTS

| | | | | | |
|---|---|---|---|---|---|
| 4,787,036 | A | * | 11/1988 | Fleming | 705/10 |
| 5,716,211 | A | * | 2/1998 | Vetter | 434/107 |
| 5,727,161 | A | * | 3/1998 | Purcell, Jr. | 705/7 |
| 5,829,983 | A | * | 11/1998 | Koyama et al. | 434/118 |
| 5,987,433 | A | * | 11/1999 | Crapo | 705/36 R |
| 5,991,741 | A | * | 11/1999 | Speakman et al. | 705/30 |
| 5,991,744 | A | * | 11/1999 | DiCresce | 705/36 R |
| 6,064,986 | A | * | 5/2000 | Edelman | 705/36 R |
| 6,253,192 | B1 | * | 6/2001 | Corlett et al. | 705/36 R |
| 6,405,179 | B1 | * | 6/2002 | Rebane | 705/36 R |
| 6,424,952 | B1 | * | 7/2002 | Yinbal | 705/36 R |
| 6,430,542 | B1 | * | 8/2002 | Moran | 705/36 R |
| 7,016,870 | B1 | * | 3/2006 | Jones et al. | 705/35 |
| 7,062,462 | B1 | * | 6/2006 | Ireland et al. | 705/38 |
| 7,158,950 | B2 | * | 1/2007 | Snyder | 705/35 |
| 2001/0044765 | A1 | | 11/2001 | Wolberg | 705/35 |
| 2002/0038285 | A1 | | 3/2002 | Golden et al. | 705/38 |
| 2003/0028466 | A1 | * | 2/2003 | Jenson et al. | 705/36 |
| 2004/0128253 | A1 | | 7/2004 | Jim | 705/59 |
| 2004/0167844 | A1 | | 8/2004 | Dolan | 705/36 |
| 2004/0267651 | A1 | * | 12/2004 | Jenson et al. | 705/36 |
| 2005/0004856 | A1 | * | 1/2005 | Brose et al. | 705/35 |
| 2005/0010510 | A1 | * | 1/2005 | Brose et al. | 705/35 |
| 2005/0060253 | A1 | * | 3/2005 | Paulsen-Dziuk et al. | 705/35 |

(Continued)

*Primary Examiner*—Narayanswamy Subramanian
(74) *Attorney, Agent, or Firm*—Baker Botts L.L.P.

(57) ABSTRACT

Analyzing educational saving plans by considering the tax implications of these plans is provided by storing a plurality of educational institution identifiers and a plurality of educational savings plan parameter sets. Each of the educational institution identifiers is associated with a corresponding set of cost parameters specifying room, board, and tuition costs for the respective educational institution. Each of the educational savings plan parameter sets specifies a characteristics of a corresponding educational savings plan. A comparative analysis of educational savings plans is generated by applying a retrieved set of cost parameters for each educational plan parameter set. This comparative analysis takes into consideration tax implications of an educational savings plan. The results of the comparative analysis are outputted on a display and/or printout so that an investor can determine which of the plurality of educational savings plans best meets their needs.

12 Claims, 37 Drawing Sheets

U.S. PATENT DOCUMENTS

| | | | |
|---|---|---|---|
| 2005/0171820 A1* | 8/2005 | Snyder .......................... 705/4 |
| 2005/0214729 A1* | 9/2005 | Greenly et al. .......... 434/307 R |
| 2005/0222951 A1* | 10/2005 | Sherman ...................... 705/40 |
| 2007/0112669 A1* | 5/2007 | Snyder ....................... 705/38 |
| 2007/0124240 A1* | 5/2007 | Ireland et al. ................. 705/38 |
| 2007/0130036 A1* | 6/2007 | Ireland et al. ................. 705/35 |
| 2007/0130061 A1* | 6/2007 | Ireland et al. ................. 705/38 |
| 2007/0156558 A1* | 7/2007 | Wolzenski et al. ............ 705/35 |
| 2007/0196794 A1* | 8/2007 | Thornton .................... 434/118 |
| 2007/0239492 A1* | 10/2007 | Sweetland et al. ............. 705/4 |
| 2007/0288358 A1* | 12/2007 | Ireland et al. ................. 705/38 |
| 2009/0106136 A1* | 4/2009 | Wright ....................... 705/35 |
| 2009/0192947 A1* | 7/2009 | Kenigsberg et al. ....... 705/36 R |

\* cited by examiner

EDUCATIONAL INSTITUTION TABLE

| EDUCATIONAL INSTITUTION IDENTIFIER (301) | EDUCATIONAL INSTITUTION NAME (303) | COST PARAMETER SET: ROOM AND BOARD (305) | COST PARAMETER SET: TUITION (307) | COST PARAMETER SET: BOOKS AND INCIDENTALS (309) |
|---|---|---|---|---|
| RUTGERS UNIVERSITY | RUTGERS UNIVERSITY | $12,750 | $42,421 | $5,030 |
| PRU | PRINCETON UNIVERSITY | $15,750 | $156,478 | $7,629 |
| 1543 | SWARTHMORE COLLEGE | $11,338 | $75,643 | $8,700 |
| MCCC | MERCER COUNTY COMMUNITY COLLEGE | $16,890 | $15,000 | $6,300 |
| NORTHWESTERN UNIVERSITY | NORTHWESTERN UNIVERSITY | $13,830 | $176,989 | $9,800 |
| UNIV. OF WIS. | UNIVERSITY OF WISCONSIN | $10,711 | $104,100 | $5,400 |
| SDSU | SAN DIEGO STATE UNIVERSITY | $17,755 | $106,500 | $3,999 |
| DEVRY | DEVRY INSTITUTE OF TECHNOLOGY | $0 | $7,000 | $450 |
| IL-8810 | UNIVERSITY OF ILLINOIS - CHICAGO CIRCLE | $9,700 | $56,000 | $8,642 |
| MENDOTA | MENDOTA STATE COLLEGE | $9,567 | $64,880 | $1,250 |

300

COST PARAMETERS (311)

FIG. 3

HOME OFFICE LOGIN

FINANCIAL PLANNING GROUP

BOSS ID

BOSS PASSWORD

SUBMIT

FIG. 4A

FINANCIAL PLANNING TOOLS

FINANCIAL PLANNING GROUP

COLLEGE FUNDING CALCULATOR
DETERMINING HOW TO BEST SAVE FOR EDUCATIONAL GOALS.

ADVANCED MDR<sup>SM</sup> PLANNER
EVALUATE MANDATORY DISTRIBUTION METHODS.

ASSET ALLOCATION ANALYSIS
INSTANTLY CREATE, VIEW AND PRINT A DETAILED ASSET ALLOCATION ANALYSIS REPORT AT YOUR WORK STATION.

IFF PROFILE CENTER
DOWNLOAD INTERACTIVE FINANCIAL FOUNDATION CLIENT DATA.

© MERRILL LYNCH & CO., 2001

FIG. 4B

FUNDING OPTIONS

FINANCIAL PLANNING GROUP

| HOME | INTRODUCTION | NAVIGATION | PRINTING | FUNDING OPTIONS | CALCULATOR |

CLIENT'S ASSETS
UGMA
529 PLAN
COMBO
EDUCATION IRA

SOME OF THE ADVANTAGES INCLUDE:

FEDERAL INCOME TAXES ARE DEFERRED UNTIL MONEY IS DISTRIBUTED TO PAY FOR QUALIFIED EDUCATION EXPENSES, WHEN THE GROWTH IN EXCESS OF CONTIBUTIONS IS TAXED AT THE CHILD'S RATE.

FUNDS MAY GROW FREE OF STATE INCOME TAXES DEPENDING ON THE LAWS IN THE STATE WHERE THE CLIENT FILES A STATE INCOME TAX RETURN.

ASSETS CAN BE USED TO PAY FOR TUITION, ROOM, BOARD, BOOKS AND REQUIRED SUPPLIES AT ANY ACCREDITED POST-SECONDARY SCHOOL IN THE U.S.

CONTRIBUTIONS ARE GENERALLY CONSIDERED REMOVED FROM THE CLIENT'S TAXABLE ESTATE.

MARRIED COUPLES FILING JOINTLY CAN GENERALLY CONTRIBUTE UP TO $100,000 IN ONE YEAR WITHOUT GIFT TAX CONSEQUENCES, PROVIDED NO MORE GIFTS ARE MADE TO THE BENEFICIARY FOR A FIVE-YEAR PERIOD. SINGLE TAXPAYERS CAN CONTRIBUTE UP TO $50,000.

© MERRILL LYNCH & CO., 2001

FIG. 9B

| FILE | EDIT | VIEW | GO | FAVORITES | HELP |

| BACK | VIEW | FWD | STOP | RE-FRESH | HOME | SEARCH | FAVOR-ITES | HISTORY | CHNL | FULL SCRN | MAIL | PRINT | EDIT |

HTTPS://FINPLANTOOLS:WORLDNET.ML.COM/CWA...

[PROFILE] [ASSETS] [RATES] [RESULTS] [REPORTS] [◄OVERVIEW] [? HELP]

| ASSETS | YOUR ASSETS | UGMA/UTMA | ED. IRA | 529 PROGRAM |
|---|---|---|---|---|
| CURRENT BALANCE: | $0 | $1,000 | $0 | $0 |
| UNREALIZED GAINS: | $0 | $0 | GROWTH: $0 | |
| MONTHLY CONTRIBUTION: | $0 | $100 | | $0 |

ALLOCATION

YOUR ASSETS/UGMA/
UTMA/ED. IRA ALLOCATION

EQUITY: 0 %
    TAXABLE
    FIXED INCOME: 100 %
    TAXFREE
    FIXED INCOME: 0 %
    CASH: 0 %
    USE AGE-TAILORED
    ALLOCATION: [ ]

529 PROGRAM
ALLOCATION

EQUITY: 80 %
    TAXABLE
    FIXED INCOME: 20 %
    CASH: 0 %
    USE AGE-TAILORED
    ALLOCATION: [ ]

SAVINGS

SAVINGS START YEAR: 2000
SAVINGS END YEAR: ● FIRST YEAR OF EDUCATION (2012)
                      ○ LAST YEAR OF EDUCATION (2015)

| ? HELP | | JUNE 22, 2000 |

ASSETS
YOUR ASSETS
CURRENT BALANCE :

THE CURRENT VALUE OF ALL ASSETS DESIGNATED FOR THIS EDUCATION GOAL WHICH ARE HELD IN THE CLIENT'S TAXABLE PORTFOLIO.

UNREALIZED GAINS :

THE AMOUNT OF APPRECIATION WITHIN THE CURRENT BALANCE THAT HAS NOT BEEN REALIZED FOR CAPITAL GAINS TAX PURPOSES. REALIZATION OF THESE GAINS AND THE SUBSEQUENT TAXATION AT THE CLIENT'S CAPITAL GAINS RATE WILL OCCUR BASED ON THE EQUITY TURNOVER RATE ON THE RATES SCREEN.

© MERRILL LYNCH & CO., 2001

| FILE | EDIT | VIEW | GO | FAVORITES | HELP |

| | HTTPS: // FINPLANTOOLS:WORLDNET.ML.COM/CWA/529/529-FRAME.ASP |

NOTE
IMPORTANT INFORMATION   ← BACK

YOUR COLLEGE INVESTMENT PLAN ANALYSIS REVIEWS YOUR EDUCATIONAL GOALS AND ESTIMATES THE ASSETS NEEDED TO ACHIEVE YOUR OBJECTIVE. IT ALLOWS YOU TO DEFINE YOUR GOAL, YOUR TAX SITUATION, AND YOUR CURRENT ASSETS AND PROJECTED SAVINGS. FROM THESE VALUES, AN ESTIMATED ADDITIONAL SAVINGS AMOUNT IS COMPUTED BASED ON THE ACCOUNT(S) INVOLVED.

THIS ANALYSIS IS BASED ON CERTAIN INFORMATION AND ASSUMPTIONS. THE INFORMATION HAS BEEN PROVIDED BY YOU. THE ASSUMPTIONS MADE, INCLUDING PROJECTED RATES OF RETURN, TAX RATES, TIME HORIZONS, COSTS AND ASSET VALUES (PARTICULARLY THOSE ASSETS HELD AWAY FROM MERRILL LYNCH), ARE ILLUSTRATIVE. MANY OF THESE ASSUMPT- TIONS ARE IDENTIFIED IN THE ANALYSIS OR CAN BE OBTAINED FROM YOUR FINANCIAL CONSULTANT. YOU SHOULD ALSO UNDERSTAND THAT THERE IS NO GUARANTEE THAT THE RESULTS SHOWN WILL BE ACHIEVED AND ACTUAL RESULTS MAY DEVIATE SUBSTANTIALLY FROM THOSE REFLECTED IN THE ANALYSIS.

PLEASE NOTE THAT YOU ARE NOT OBLIGATED TO IMPLEMENT ANY STRATEGY THAT MAY BE DEVELOPED USING THIS ANALYSIS. IF YOU CHOOSE TO IMPLE- MENT ANY FINANCIAL STRATEGY THROUGH MERRILL LYNCH, OUR REGULAR FEES AND CHARGES FOR PRODUCTS AND SERVICES WILL APPLY.
IN EXECUTING TRANSACTIONS FOR YOUR ACCOUNT, MERRILL LYNCH, AS A BROKER-DEALER, MAY ACT AS AGENT OR AS PRINCIPAL AND WILL BE COMPENSATED, ALONG WITH YOUR FINANCIAL CONSULTANT, THROUGH COMMISSIONS, MARK-UPS/MARK-DOWNS OR OTHER FEES.

 © MERRILL LYNCH & CO., 2001

FIG. 22

TECHNIQUES FOR ILLUSTRATING AND ANALYZING COLLEGE SAVINGS PLANS

This is a continuation of application Ser. No. 09/620,452, filed on Jul. 20, 2000 now abandoned.

FIELD OF THE INVENTION

The invention relates to machine-executable techniques for performing financial calculations directed to college saving plans.

BACKGROUND ART

With the ever-increasing costs of tuition, room and board, many families are interested in starting a savings program for college expenses. Although it is possible to use a conventional savings or money market account for this purpose, a wide variety of educational funding alternatives have been developed. These alternatives fall into four categories: (1) UGMA/UTMA Accounts (Uniform Gifts to Minors Act/Uniform Transfers to Minors Act), (2) Client Assets, (3) '529' College Investing Plans, and (4) Education IRA's. Of course, these categories are not mutually exclusive: it is possible for the investor to allocate assets to a plurality of funding alternatives, such as an Education IRA and a UGMA/UTMA Account.

Client Assets include any financial assets that are owned by the client, such as savings or money market accounts, stocks, bonds and various other financial instruments. This asset category provides the investor with a significant amount of flexibility. Although the client may refer to these assets as part of a "college fund", there are typically no legal restraints or incentives that limit disbursement of the funds to meet educational expenses. If the prospective student decides not to attend an institution of higher learning, if a financial emergency arises, or if the asset donor has a "falling out" with the child, the assets can readily be used for non-educational purposes, or transferred to a third party. the assets can readily be used for non-educational purposes, or transferred to a third party. Unfortunately, this flexibility comes at a price: any investment income will be taxed according to the client's ordinary income and/or capital gains tax rate.

Funds held in UGMA/UTMA accounts are controlled by a custodian until the child reaches the age of majority. These accounts are advantageous in that investment income is taxed at the childs' rate, which is typically lower than the custodian's rate. Additionally, the gift may qualify for the annual gift tax exclusion. Moreover, if the gift involves property, once the property is sold, the gain is taxable at a special, lower rate. UGMA/UTMA accounts do present several shortcomings. The client no longer controls the assets. Worse yet, the child owns the funds and, upon reaching the age of majority, can use them for any purpose whatsoever. Depending upon the age of the beneficiary, gifts made to a UGMA/UTMA account by the custodian of the account could be included in the custodian's estate for tax purposes. The child's ability to qualify for financial aid may be adversely impacted. Finally, income generated from assets that are owned by a child are subject to special income tax considerations. These considerations are a function of the child's age and income. If the proper conditions are not met, the investment income could be taxed at the parent's (usually higher) rate.

'529' College Investing Plans are relatively new savings vehicles that are becoming increasingly popular. These plans offer tax-advantaged saving and investing while, at the same time, providing the client with some control over fund distribution. Federal taxes are deferred until the funds are distributed, when growth in excess of contributions is taxed at the child's rate. Funds may grow free of state income taxes, depending upon the laws in the state(s) where the client files a state income tax return. Assets can be used to pay for tuition, room, board, books, and required supplies at any accredited post-secondary school in the United States. Contributions are generally considered as having been removed from the client's taxable estate. Married couple filing jointly can contribute up to $100,000 in a single year without gift tax consequences, provided that no more gifts are made to the beneficiary for a five year period. Single taxpayers can contribute up to $50,000 in a single year.

A fundamental advantage of '529' College Investing Plans is that the participant retains control of the account. Moreover, the participant can change beneficiaries at any time, as long as the new beneficiary is in the same family as the original beneficiary, without incurring a penalty. Although non-qualified withdrawals can be made at any time, the participant must pay a penalty on earnings. Earnings from non-qualified withdrawals are taxed as ordinary income at the participant's rate. However, the participant may make penalty-free withdrawals if the beneficiary receives a scholarship, or in the event that the beneficiary dies or becomes disabled. There are no annual income limits on participation, no annual filing requirements (unless a withdrawal has been made), and substantially no time limits for which assets must be held in the plan.

For many individuals, the '529' plans represent a significant improvement over previously-existing college investment vehicles. However, these plans are not without their shortcomings. Once funds are contributed to the plan, the participant does not control the manner in which the funds are invested. Investment decisions are typically made by fund managers who are hired by the sponsoring state. It is only possible to make contributions to '529 plans in the form of cash. Securities cannot be transferred into the plan. Of some significance, the funds can only be used for educational purposes to receive full income tax benefits. If funds are withdrawn for other than educational purposes, the earnings portion is taxed as ordinary income, and a 10% penalty is assessed.

It is possible to combine a '529 plan with a UGMA/UTMA transfer, so as to enable a client to benefit from the tax advantages of both funding alternatives. Monthly contributions are made to a UGMA/UTMA fund until the investment income generated within the account exceeds the tax-exempt limit of $700 per annum. Any further contributions are then made to a '529 college investment plan to take advantage of tax-deferred growth.

One last category of education investment alternatives is an Education IRA. This IRA allows annual, non-deductible contributions up to $500 per annum until the beneficiary reaches the age of 18. IRA contributions grow tax-free. Withdrawals are tax-free if they are used for qualifying educational expenses. Unused funds may be transferred to other family members, but only if the funds are then used for educational purposes. Anyone, including grandparents, may contribute to an education IRA. However, contributions from all sources may not exceed $500 per beneficiary per year. Eligibility is based upon the contributor's modified adjusted gross income, and phaseout starts when this income exceeds $150,000 for married contributors and $95,000 for singles. In general, assets must be distributed by the time the beneficiary reaches the age of 30.

From the foregoing summary of various college investment plans, it is apparent that potential contributors are confronted by an almost bewildering array of options. It may be difficult or impossible for the average contributor to determine which plan is best for a given situation. In an effort to provide some guidance to these contributors, a number of web sites have been developed which permit investors to assess the pros and cons of a specific college investment plan. Such web sites differ greatly in terms of the financial calculation program(s) that are used, the inputs that may be entered into these programs, and the outputs that are provided.

Irrespective of the manner in which a given college investment web site is implemented, existing financial calculation programs do not consider the tax implications of various funding alternatives for the contributor and the child. These considerations are significant factors in determining which investment plan or plans are best suited to the needs and circumstances of specific investors. If tax considerations are ignored, an inappropriate or suboptimal college investment vehicle may be selected.

Many existing college investment web sites are affiliated with state-administered '529 college investment plans. These plans are sometimes referred to as Qualified State Tuition Programs. One of the most advanced web sites is operated by the New York State College Tuition Choice Savings Program (URL: http://www.nysaves.com). This site includes a calculation program that accepts a child's current age, college start date, current college savings, annual savings after tax rate of return, and estimated annual tuition. The program outputs a year-by-year savings chart and a college savings graph. However, the savings charts and graphs do not compare one college investment plan with another. Moreover, the tax consequences of the investments are not considered. The program accepts an input in the form of an after-tax rate of return, whereas the contributor may not be able to determine this rate with any degree of ease and certainty, or may simply not wish to calculate this rate by performing a series of tedious mathematical calculations. Also, the contributor may wish to obtain information related to the manner in which this rate of return could be maximized, instead of merely entering an estimated value as a fixed input to the financial calculation program.

Another exemplary college investment web site is operated by a company known as "TIAA-CREF". The site utilizes a "college savings calculator" that accepts the prospective student's current age, age at which the student will start college, current college savings, monthly savings contribution, current tuition cost, estimated annual tuition inflation, and annual after-tax return on savings. In response to these inputs, the program calculates the projected year-to-year increase in college savings balance, as well as an inflation-adjusted tuition goal. A graph is displayed to show how far a contributor's projected savings balance will go toward covering tuition costs over four full years of college attendance. Of significance, the calculations are based upon after-tax rate of returns. Accordingly, the contributor is left with the task of assessing the tax ramifications of an investment option. These ramifications may have a significant financial impact on the efficacy of the savings plan in meeting educational expenses. Moreover, the program does not provide a comparison among various investment options.

Yet another college investment web site is operated by Fidelity Investments. This site provides a qualitative "comparison table" that lists the basic advantages and disadvantages of various college funding alternatives. However, it is important to realize that this table does not show the results of any financial calculation, nor does it contain any user-specific information. Rather, the table includes a list of predetermined textual messages. The Fidelity Investments site does offer a calculation program called a "college cost calculator, but this calculator is not tied to the comparison table. The calculator accepts inputs in the form of the child's age, years remaining until the child enters college, years of college planned, pre-tax rate of return, college inflation rate, and present annual college cost. The outputs are provided in numeric form, and include total college cost in today's dollars, total college cost in future dollars. Target savings amounts are provided, broken down into monthly, yearly, and quarterly increments. A one-time lump sum savings figure is also provided. As was the case with previously-mentioned sites, the calculator output does not take into account tax implications for the parent and the child. Nor does this output show any type of numerical comparison between different college funding alternatives.

In view of the foregoing web site analysis, there is a need for a college funding calculator that considers the tax implications of each of a plurality of college saving plans. There is also a need for a calculator that provides a comparative analysis for these saving plans, so as to enable an investor to select a plan or combination of plans that best meets his or her needs.

SUMMARY OF THE INVENTION

Novel computerized methods are described for illustrating and analyzing educational saving plans by considering the tax implications of these plans. The method is for use with a computer-readable medium on which are stored a plurality of respective educational institution identifiers and a plurality of educational savings plan parameter sets. Each of the educational institution identifiers is associated with a corresponding set of cost parameters specifying at least one of room, board, and tuition costs for the respective educational institution. Each of the educational savings plan parameter sets specifies one or more characteristics of a corresponding educational savings plan. The method includes the steps of receiving at least one educational institution identifier and, for each of the received identifiers, retrieving the corresponding set of cost parameters from the computer-readable medium. A comparative analysis of a plurality of educational savings plans is generated by applying each retrieved set of cost parameters to each of the educational plan parameter sets. This comparative analysis takes into consideration the tax implications of a plurality of educational savings plan. The results of the comparative analysis are outputted on a display and/or printout so that an investor can determine which of the plurality of educational savings plans best meets his or her needs.

Pursuant to a further embodiment of the invention, the educational institution identifiers stored on the computer-readable medium specify undergraduate as well as graduate schools. The cost parameter sets store the current costs of tuition, room, and board for each of a plurality of educational institutions across the United States. The educational savings plans include at least one IRC (Internal Revenue Code) Section 529 Plan.

Optionally, the analysis implements a comparison of a specific asset allocation, and/or use of the Section 529 Plan asset allocation applied to all assets, so as to receive a comparison based upon tax advantages only. Moreover, the analysis may optionally consider a blended and/or progressive asset allocation based upon the age of the prospective student. The results of the analysis may optionally be provided in the form of a graphical comparison of monthly and/or lump sum savings needed for each of the plurality of saving plans. This graphical comparison considers the tax implications of the saving plans. When selecting a saving plan that is a combination of various investment vehicles as, for example, a Section 529 Plan, a UGMA/UTMA Plan, and an Education IRA, the graphical comparison displays the most advantageous annual breakdown for saving money. A further optional feature permits a user to toggle back and forth between display of a first and a second graphical comparison. The first graphical comparison assumes that the maximum permissible annual Education IRA contribution will be made, whereas the second graphical comparison does not make this assumption. A still further optional feature provides explanatory textual outputs setting forth the advantages and disadvantages of various saving plans.

An optional rate adjustment feature permits interest rate and/or appreciation assumptions to be changed in the analysis, so that the results of the analysis will provide a graphical comparison display for each of a plurality of different interest rate assumptions. The analysis considers tax implications such as capital appreciation, dividends, and turnover. An optional date adjustment feature enables users to select starting and ending dates for periodic saving plans.

BRIEF DESCRIPTION OF THE DRAWINGS

For a more complete description of the present invention, the Detailed Description of the Preferred Embodiments thereof is to be taken in connection with the following drawings, in which:

FIG. 3 is a diagram setting forth an illustrative data structure for an Educational Institution Table;

FIGS. 4A and 4B are display screen captures showing an illustrative password screen and menu from which an educational funding calculator web site may be accessed;

FIGS. 8A-8B, 9A-9F, and 10A-10B are display screen captures describing the basic characteristics of various educational investment plans;

FIG. 16 is a display screen capture showing assets, allocation, and savings for an investor;

FIG. 17 is a display screen capture on which various assumptions about rates of return may be entered and/or estimated;

FIG. 22 is a display screen capture that provides explanatory information to the investor about the results of the educational savings plan analysis;

DETAILED DESCRIPTION OF THE PREFERRED EMBODIMENTS

Figure 1:
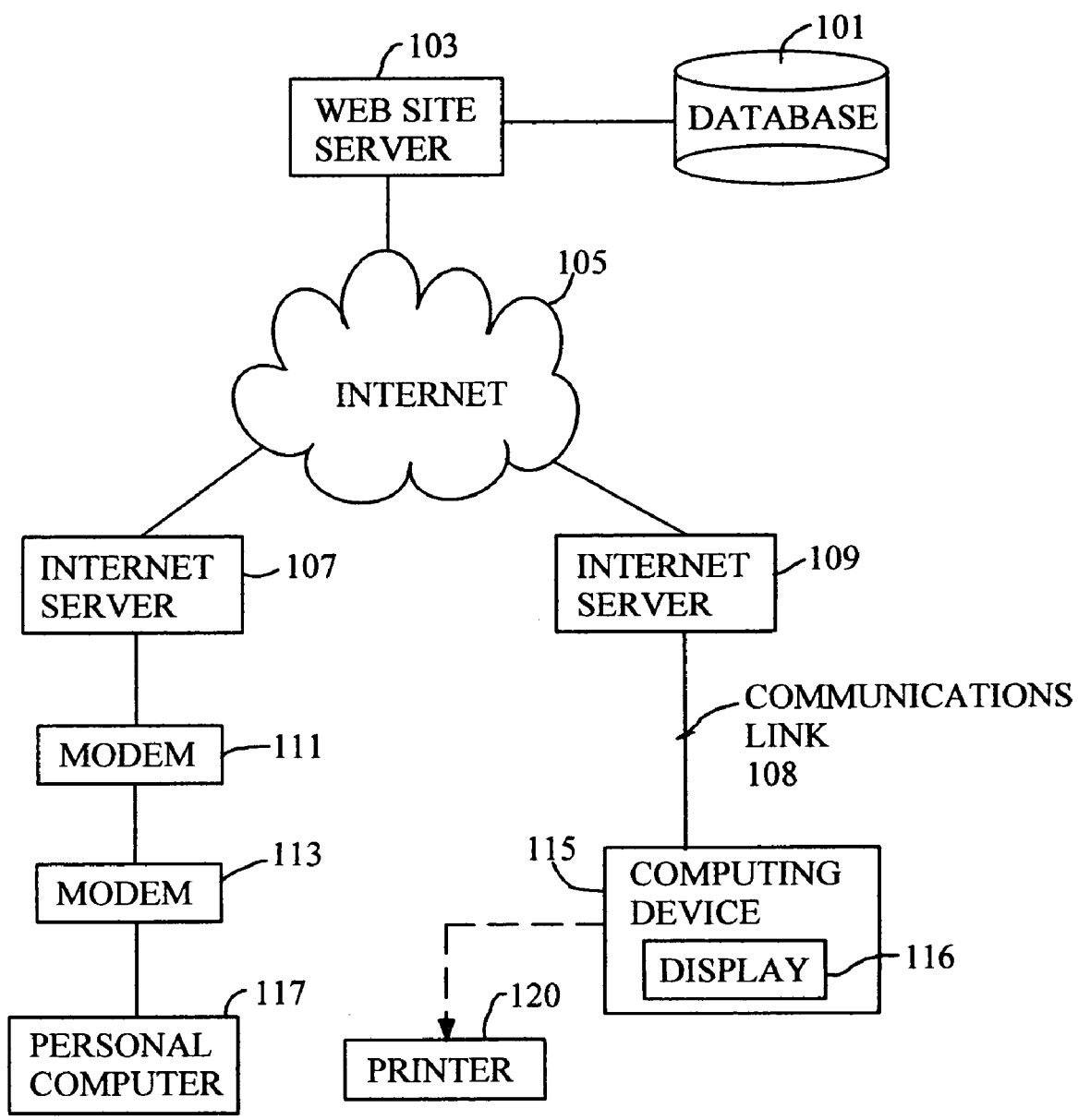
FIG. 1 is a hardware block diagram setting forth an illustrative operational environment for the present invention.
Figure 2A:
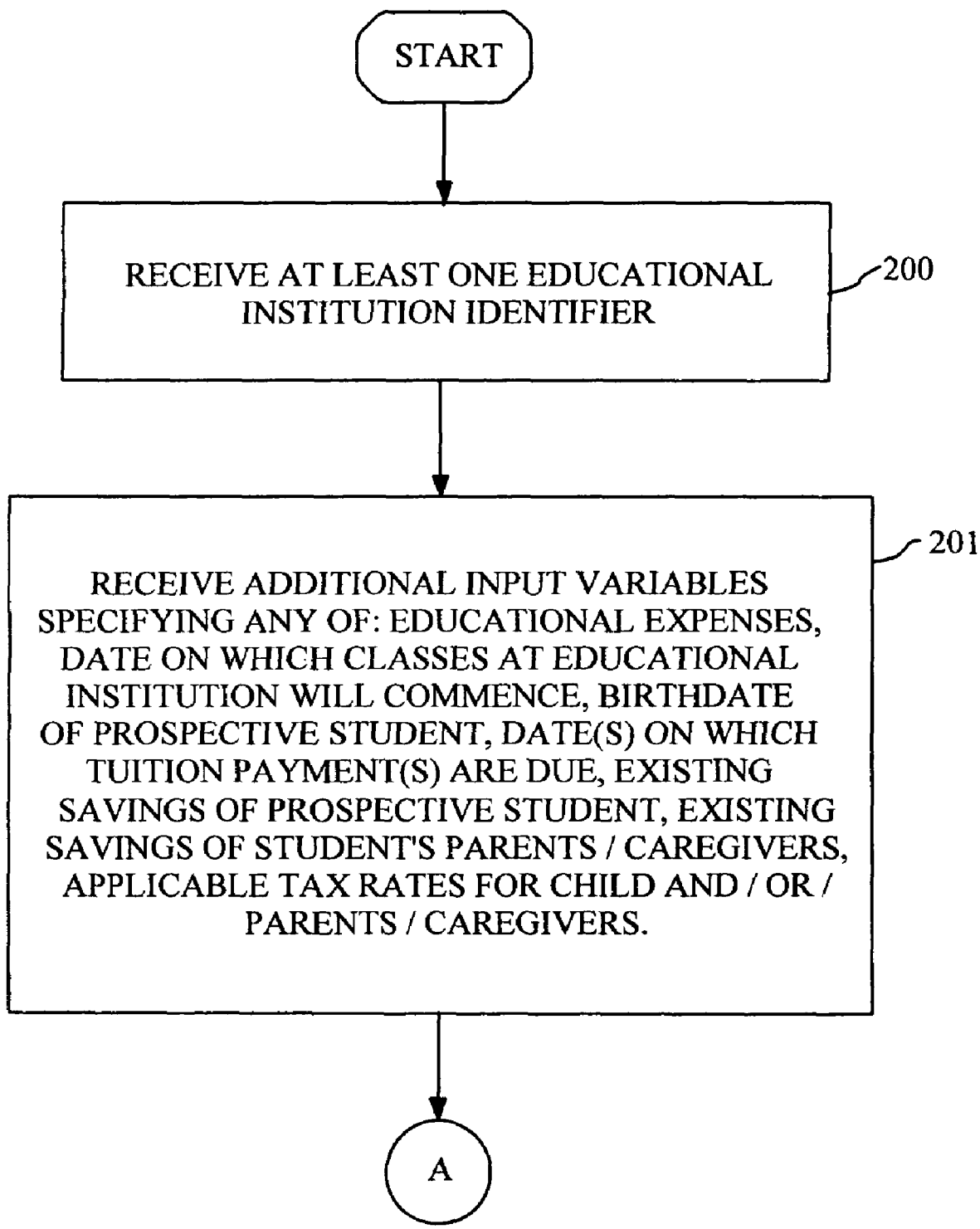
FIGS. 2A-2D together comprise a flowchart setting forth an overall operational sequence for a preferred embodiment of the invention.
Figure 2B:
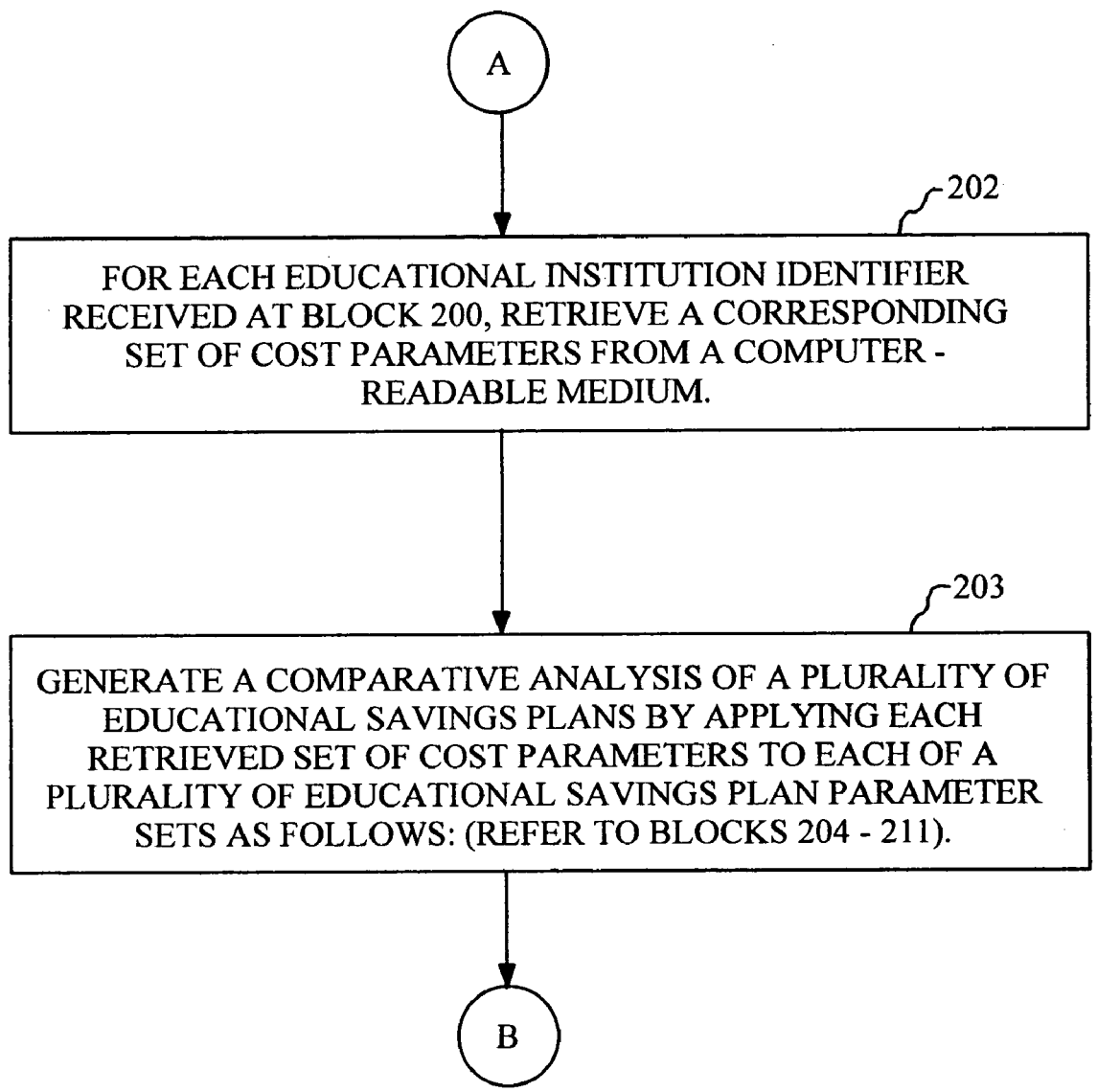
Figure 2C:
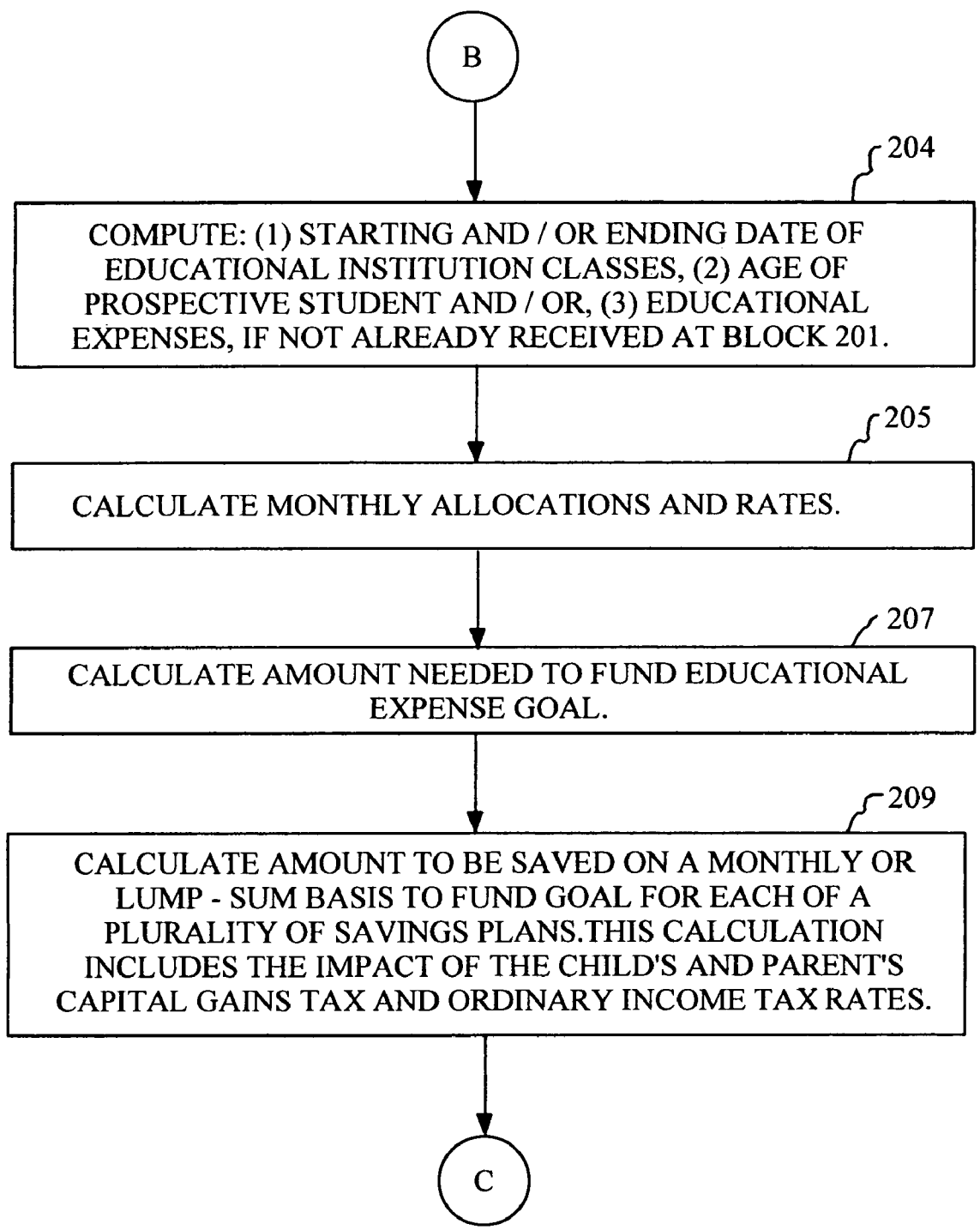
Figure 2D:
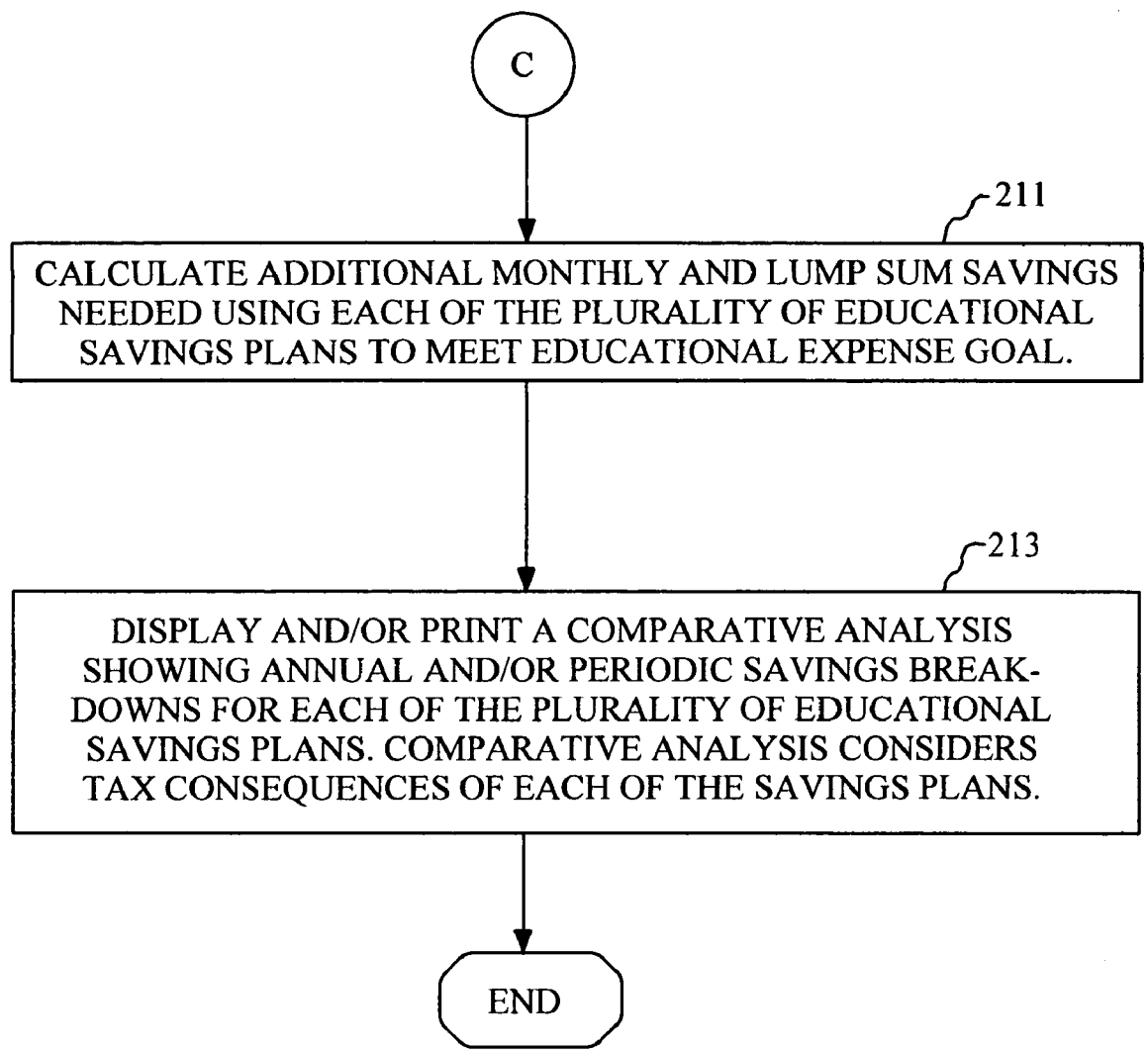

FIG. 1 is an illustrative hardware block diagram setting forth an Internet-based operational environment equipped to implement the techniques of the present invention. As a preliminary matter, it should be pointed out that other hardware configurations could be employed to implement the invention, and some of these configurations may not operate over the Internet. With reference to FIG. 1, the methods described herein are intended for use with a computer-readable medium on which are stored a plurality of respective educational institution identifiers and a plurality of educational savings plan parameter sets. Illustratively, this computer-readable medium is provided in the form of database 101. Each of the educational institution identifiers is associated with a corresponding set of cost parameters specifying at least one of room, board, and tuition costs for the respective educational institution. Each of the educational savings plan parameter sets specifies one or more characteristics of a corresponding educational savings plan. Database 101 may be organized in the form of one or more lookup tables which, for example, associate each of a plurality of educational institutions with one or more cost parameters, such as the cost of tuition and the cost of room-and-board, as is shown in FIG. 3 (to be described in greater detail hereinafter).

Database 101 is readable from a computer such as web site server 103. Web site server 103 is equipped with software in the form of a novel educational funding calculator, to be described hereinafter in connection with FIGS. 2A-2D. Any of various remote devices can access web site server through the Internet 105. The example of FIG. 1 shows two illustrative types of remote devices—namely, personal computer 117 and computing device 115—but it is to be understood that any of a wide variety of remote devices may be used in connection with the methods of the present invention.

Personal computer 117 is coupled to an Internet Server 107 via a modem-111-to-modem-113 link. In turn, Internet Server 107 is coupled to Internet 105. Accordingly, inputs entered into personal computer 117 are conveyed over modem-111-to-modem-113 link to Internet server 107, whereupon these inputs are conveyed over the Internet 105 to web site server 103. These inputs are then used by the educational funding calculator program which, in the example of FIG. 1, is executed at web site server 103. The results of the educational funding calculator program can be outputted to a printer 120 that interfaces with personal computer 117. The results can also be outputted from computing device 115 to printer 120.

Web site server 103 may also be accessed from a computing device 115. Computing device 115 is coupled to an internet server 109 via a communications link 108. Communications link 108 may represent any mechanism for conveying information from one place to another, including, for example, wired communications, wireless communications, optical communications, and various combinations thereof. In turn, internet server 109 is coupled to Internet 105. The results of the educational funding calculator can be outputted to a display 116 integral to, and/or that interfaces with, computing device 115.

The specific hardware configuration shown in FIG. 1 is for illustrative purposes only. For example, it is also possible to execute the college funding calculator program at Internet server 107 or Internet server 109, and/or to distribute execution of this program amongst a plurality of hardware elements. A standalone version of the calculator program could be adapted to run on a personal computer 117 without the necessity of connecting to the Internet. Moreover, in the Internet embodiment of FIG. 1, the modem-111-to-modem-113 link, Internet Server 107, and personal computer 117 are shown for illustrative purposes only, as any of various other hardware elements may be used as mechanisms for accepting user input and forwarding this input to the Internet 105.

Refer now to FIGS. 2A-2D, which together comprise a flowchart setting forth an overall operational sequence for a preferred embodiment of the invention. The method commences at block 200 where (a) at least one educational institution identifier, and (b) the prospective student's age and/or date of birth, are received. Illustrative examples of educational institution identifiers are discussed hereinafter with reference to FIG. 3. At block 201, additional optional information may be received.

This optional additional information may specify, for example, educational expenses, the date on which courses at an educational institution will commence, the date on which educational courses have been completed, the age of the prospective student, the date(s) on which tuition payment(s) are due, the tax rates of prospective students and parents/caregivers, existing savings of the prospective student, and existing savings of the prospective student's parents, caregivers, and/or other family members. These additional optional input variables are mentioned for illustrative purposes, as other variables in addition to, or in lieu of, the aforementioned optional variables may or may not be employed. Moreover, even if some or all of these variables are employed, they need not be explicitly entered by a user. This may be accomplished by associating the educational institution identifiers with one or more optional variables as, for example, in the form of a lookup table similar to that shown in FIG. 3, but including one or more additional columns corresponding to one or more optional variables.

Next, at block 202 (FIG. 2B), for each of the educational institution identifiers received at block 200, a corresponding set of cost parameters is retrieved from the computer-readable medium. A comparative analysis of a plurality of educational savings plans is generated by applying each retrieved set of cost parameters to each of the educational savings plan parameter sets (block 203). This comparative analysis takes into consideration the tax implications of a plurality of educational savings plan. The actual process of applying the retrieved cost parameters to the educational savings plan parameter sets is described in greater detail with reference to blocks 204-211. At block 204, the starting and/or ending date of educational institution classes is computed, if this information was not entered as an optional variable or included in the aforementioned lookup table. The age of the prospective student is computed from information received at block 200, if the age was not explicitly entered by the user. Finally, educational expenses are computed, based upon cost parameters associated with the received educational institution identifier(s), if this information was not explicitly specified and entered by the user. For each of respective received educational institution identifiers, the corresponding amount of educational expenses may be conceptualized as an educational expense goal Next, monthly allocations and rates are calculated (block 205). For each educational institution identifier that is received at block 200, the amount needed to fund the educational expense goal is calculated (block 207). For each of a plurality of educational savings plans, the amount to be saved on a periodic, monthly, and/or lump-sum basis to fund the educational expense goal is determined (block 209). This calculation includes the impact of the prospective student's capital gains tax and ordinary income tax rates, as well as the impact of the parents' (or guardians') capital gains tax and ordinary income tax rates. For the sake of convenience, the prospective student could be referred to as a "child", although it is to be understood that the techniques of the present invention are also applicable to prospective students that are not necessarily children, and prospective students who may not have living parents or guardians. If more than one educational institution identifier was received at block 200, the process of block 209 is repeated for each educational institution, because each of these institutions is likely to have a corresponding expense goal that is unique to that institution. Possible exceptions are state-operated schools having a multiplicity of campuses throughout the state. In these cases, costs could be substantially identical as, for example, if a student is comparing Northern Illinois University to Southern Illinois University, and intends to live in on-campus housing. At block 211, additional monthly (and/or periodic, and/or lump sum) savings needed to fund each of the educational expense goals is calculated, using each of the plurality of college savings plans. After the comparative analysis of blocks 204-211 is complete, the results of the analysis are outputted on a display and/or printout so that an investor can determine which of the plurality of educational savings plans best meets his or her needs (block 213). This comparative analysis may, but need not, be provided in the form of a table or graphical object that shows annual and/or periodic savings breakdowns for each of the plurality of educational savings plans. Pursuant to a further embodiment of the invention, the educational institution identifiers stored on the computer-readable medium specify undergraduate schools. Optionally, the identifiers could specify graduate schools. The cost parameter sets store the current costs of tuition, room, and board for each of a plurality of educational institutions across the United States. The educational savings plans include at least one IRC (Internal Revenue Code) Section 529 Plan. The comparative analysis optionally provides for a comparison of a specific asset allocation, and/or use of the Section 529 Plan asset allocation applied to all assets, so as to receive a comparison based upon tax advantages only. Moreover, the analysis may optionally be adapted to provide a blended and/or progressive asset allocation based upon the age of the prospective student.

The displayed and/or printed output may optionally be adapted to provide a graphical comparison of monthly and/or lump sum savings needed for each of the plurality of saving plans. This graphical comparison considers the tax implications of the saving plans. When selecting a saving plan that is a combination of various investment vehicles as, for example, a Section 529 Plan, a UGMA/UTMA Plan, and an Education IRA, the graphical comparison displays the most advantageous annual breakdown for saving money. A further optional feature is operable when the output is provided on a display screen. A mechanism is provided by which a user can toggle back and forth between a first and a second graphical comparison. This toggling feature may be provided, for example, in the context of a personal computer, by pointing and clicking a computer mouse at or on the first or second graphical comparison. Illustratively, the first graphical comparison assumes that the maximum permissible annual Education IRA contribution will be made, whereas the second graphical comparison does not make this assumption. A still further optional feature provides explanatory textual outputs setting forth the advantages and disadvantages of various saving plans. An optional rate adjustment mechanism coupled to the comparative analysis procedure permits interest rate assumptions to be changed, so as to provide a graphical comparison display for each of a plurality of different interest rate assumptions. The comparative analysis will consider tax implications such as capital appreciation, dividends, and turnover.

FIG. 3 is a diagram setting forth an illustrative data structure for an Educational Institution Table 300. A first data field, Educational Institution Identifier 301, stores a plurality of educational institution identifiers which uniquely specify a corresponding educational institution and/or a theoretical fictitious "typical", "average", or "representative" educational institution. For example, a college institution identifier could be used to specify an "average public" undergraduate school. Any of various formats could be used to provide educational institution identifiers, and FIG. 3 includes some illustrative examples. For example, the actual name of the educational institution may be employed as in the case of "Northwestern University" and "Rutgers University". Optionally, the user may be provided with a drop-down menu on a web page that includes actual educational institution names. One or more of these institutions are then selected by pointing and clicking a computer mouse, whereupon the user's selection(s) are received at the web site server. Other types of educational institution identifiers that may be received are as follows. An alphabetic code may be used, such as "PRU" for Princeton University, "MCCC" for Mercer County Community College, or "SDSU" for San Diego State University. A numeric code could be employed: "1543" for Swarthmore College. Letters and numbers may be combined, as is the case with IL-8810, specifying the University of Illinois at Chicago Circle. A portion of the actual school name may be used, such as "Univ of Wisc" for the University Of Wisconsin, "DeVry" for the DeVry Institute of Technology, and "Mendota" for Mendota State College.

Each of a plurality of educational institution identifiers in Educational Institution Table 300 is associated with a corresponding Educational Institution Name 303 field, and a Cost Parameters field 311. Use of the Educational Institution Name 303 field is optional in cases where the educational institution identifier is the actual name of the educational institution. The cost parameters field 311 is broken down into three sub-fields: a cost parameter set specifying room and board costs (305), a cost parameter set specifying tuition costs (307), and a cost parameter set specifying the cost of books and incidentals (309). These cost parameter sets may be indicative of annual costs, semester-by-semester costs, or the costs involved during the entire time period from starting classes to obtaining a degree. Alternatively, some other periodic measure of educational institution costs may be employed. If one assumes that the Educational Institution Table 300 of FIG. 3 specifies annual costs, then annual tuition for Mercer County Community College would be $15,000. Costs of room and board at Northwestern University would be $13,830 per year. Books and incidentals would cost $1250 per year at Mendota State College. It should be emphasized that the costs shown in Educational Institution Table are given only for purposes of illustration, and they are not intended to be accurate representations of actual costs.

FIGS. 4A and 4B are display screen captures showing an illustrative introductory menu from which an educational funding calculator web site may be accessed. The screen captures inform users that the educational funding calculator may be used to help clients assess their projected ability to fund an educational goal. The analysis identifies the best ways for the client to save additional funds, based upon the income tax situation of the client and/or the prospective student. Other optional financial planning tools, such as a minimum required distribution planner, could also be accessed from the illustrative web page of FIGS. 4A and 4B.

Figure 5:
FIG. 5 is a display screen capture showing an illustrative web page that contains introductory information about the educational funding calculator described herein.

FIG. 5 is a display screen capture showing an illustrative web page that contains further introductory information about the educational funding calculator described herein. The display screen informs the user that it is difficult to determine the best method of saving for an educational goal. However, the college funding calculator (described hereinbefore with reference to FIGS. 2A-2D) can be used to review the pros and cons of the various funding alternatives, with the appropriate income tax factors taken into consideration. The college funding calculator is equipped to analyze the client's portfolio asset base, UGMA/UTMA accounts, Section 529 College Investing Plans, the combination of a UGMA/UTMA account and a Section 529 College Investing Plan, and an Education IRA.

Figure 6A:
FIGS. 6A and 6B are display screen captures setting forth an illustrative navigational topology for the educational funding calculator web site.
Figure 6B:

FIGS. 6A and 6B are display screen captures setting forth an illustrative navigational topology for the educational funding calculator web site. The web site is organized into four "compartments": profile, assets, allocation, and results. The profile compartment receives and/or processes information about: (1) the child and/or prospective student, (2) income tax brackets, (3) educational costs, and (4) the savings time frame. The assets compartment receives details about the client's current holdings in and monthly contributions to, any of various accounts, as well as the overall asset allocation for all funds, excluding funds held in a Section 529 College Investing Plan.

The allocation compartment provides a summary of the manner in which portfolio, UGMA/UTMA, and Education IRA assets are allocated, as well as any Section 529 College Investing Plan allocation schedules. This compartment also provides access to a mechanism which can receive inputted projected rates of return for the various aforementioned asset categories and, in response to this input, indicate an equity turnover percentage.

The results compartment provides a printout and/or display detailing the monthly and lump sum additional savings needed in each of a plurality of educational savings plans and/or accounts to fully fund the educational goal(s). These results may also include one or more graphs which show the accumulation and depletion of assets throughout the savings period and a comparison of the total savings needed by account.

Figure 7:
FIG. 7 is a display screen capture providing instructions as to the manner in which calculator results may be saved and/or printed.

FIG. 7 is a display screen capture providing instructions as to the manner in which calculator results may be saved and/or printed. Once the comparative analysis has been performed, a printout, display, and/or output file may be generated. Any such printout could be in the form of a written report indicative of client asset distribution. An optional output file could be generated, whereupon the client saves one or more college investment scenarios for future review and analysis. A further functionality is provided so that, if the comparative analysis appears on a display screen, the user can generate a screen printout. In the operational environment of a typical web browser, this may be accomplished by selecting "Print" from the "File" toolbar drop-down menu.

Figure 8A:
Figure 8B:
Figure 9A:
Figure 9C:
Figure 9D:
Figure 9E:
Figure 9F:
Figure 10A:
Figure 10B:

FIGS. 8A-8B, 9A-9F, and 10A-10B are display screen captures describing the basic characteristics of various educational investment plans. FIGS. 8A and 8B describe the advantages, and disadvantages of client assets as well as UGMA/UTMA accounts. These pros and cons were previously discussed in the section entitled, "Background of the Invention". FIGS. 9A-9F describe Section 529 College Investing Plans, and FIGS. 10A-10B cover Education IRAs as well as combinations of UGMA/UTMA accounts with Section 529 College Investing Plans.

Figure 11:
FIG. 11 is a display screen capture showing a web page for accepting entered financial information related to a prospective student and/or that student's family.

FIG. 11 is a display screen capture showing a web page for accepting entered financial information related to a prospective student and/or that student's family. Received inputs include the prospective student's name (Matthew), the date of birth (Apr. 4, 1994), state of residence (Pennsylvania), ordinary income and capital gains tax rates for the student as well as his parents, one or more educational institution identifiers (in this case, a generic "Average Public" undergraduate school). The start year is inputted (or calculated) as 2012. The retrieved costs are $9,271 per year, and four years of school are anticipated. The education cost increase rate is received or calculated or projected at 5%.

Figure 12:
FIG. 12 is a display screen capture showing a web page equipped to receive a user's selection of educational institution.

FIG. 12 is a display screen capture showing a web page equipped to receive a user's selection of educational institution. In this example, the user can enter in an educational institution name or a portion thereof, and a search will be performed to locate any schools that match the entered parameters. The user can then highlight one or more of the retrieved educational institutions, whereupon the user's selection will be received for further processing. In the example of FIG. 12, the user searched for and then selected "LaSalle University". The web site server received this selection, and retrieved cost parameters for LaSalle specifying a current cost of $22430.

Figure 13:
FIG. 13 is a display screen capture showing a web page equipped to receive information about a user's assets.

FIG. 13 is a display screen capture showing a web page equipped to receive information about a user's assets. In this example, there are no client assets, no UGMA/UTMA accounts, and no Educational IRAs. Educational savings were to have commenced in 1999. A Section 529 College Investment Plan is to be the investment vehicle of choice, with 80% allocated to equity, and 20% allocated to taxable fixed income. The savings period is selected to end at the first year of education (2012).

Figure 14:
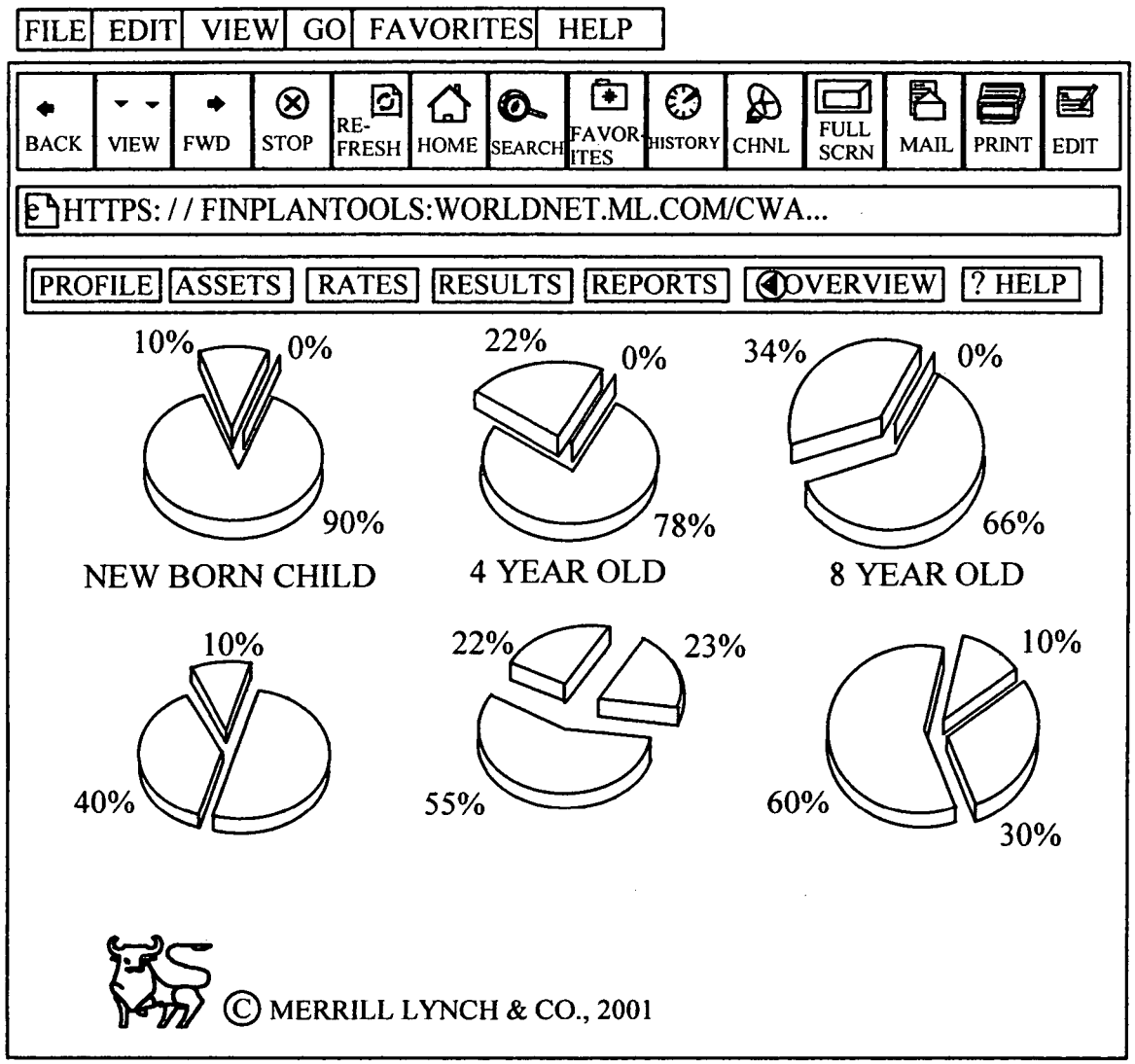
FIG. 14 is a display screen capture showing an investor's asset allocation for a state-sponsored college saving ('529) plan.

FIG. 14 is a display screen capture showing an exemplary investor's asset allocation for a state-sponsored college saving ('529) plan. Note, however, that it is also possible to take a fixed allocation of the '529 plan assets. The illustrated '529 plan allocation transitions over a prospective student's pre-college lifetime from an aggressive investment approach to a more conservative approach. For example, if the prospective student is a newborn child, 90% of '529 plan assets are invested in equities, 10% is in fixed income assets, and 0% is cash. Once the child is 8 years old, 66% is invested in equities, and 34% is in fixed income assets. At age 16, 22% is in equities, 23% is in cash, and 55% is in fixed income assets. One can appreciate the gradual progression from a very aggressive, fast-growth, but risky financial position to one of slower, but more stable and consistent growth.

Figure 15:
FIG. 15 is a display screen capture showing an investor's asset allocation at yearly intervals in terms of equity, fixed income, and cash.

FIG. 15 is a display screen capture showing an investor's asset allocation at yearly intervals in terms of equity, fixed income, and cash. The actual information content of FIG. 15 is similar to that of FIG. 14, except that FIG. 14 shows the information in pie-chart format, whereas FIG. 15 shows this information in the form of a table. Due to possible display screen constraints, it may only be possible to show a limited number of pie charts on a typical computer monitor before the charts lose legibility. Accordingly, FIG. 14 includes pie charts at four-year intervals, whereas the table of FIG. 15 can include allocation information on a year-by-year basis.

FIG. 16 is a display screen capture showing assets, allocation, and savings for an investor. Current balance, unrealized gains, and monthly contributions for client assets, UGMA/UTMA accounts, Educational IRAs, and 529 Plans are received and/or calculated. A 529 plan allocation of 80% equities and 20% fixed income assets is specified. The beginning of the savings period started in 1999, and the savings period will end in the year 2012, which is the first year of college education.

Figure 17:
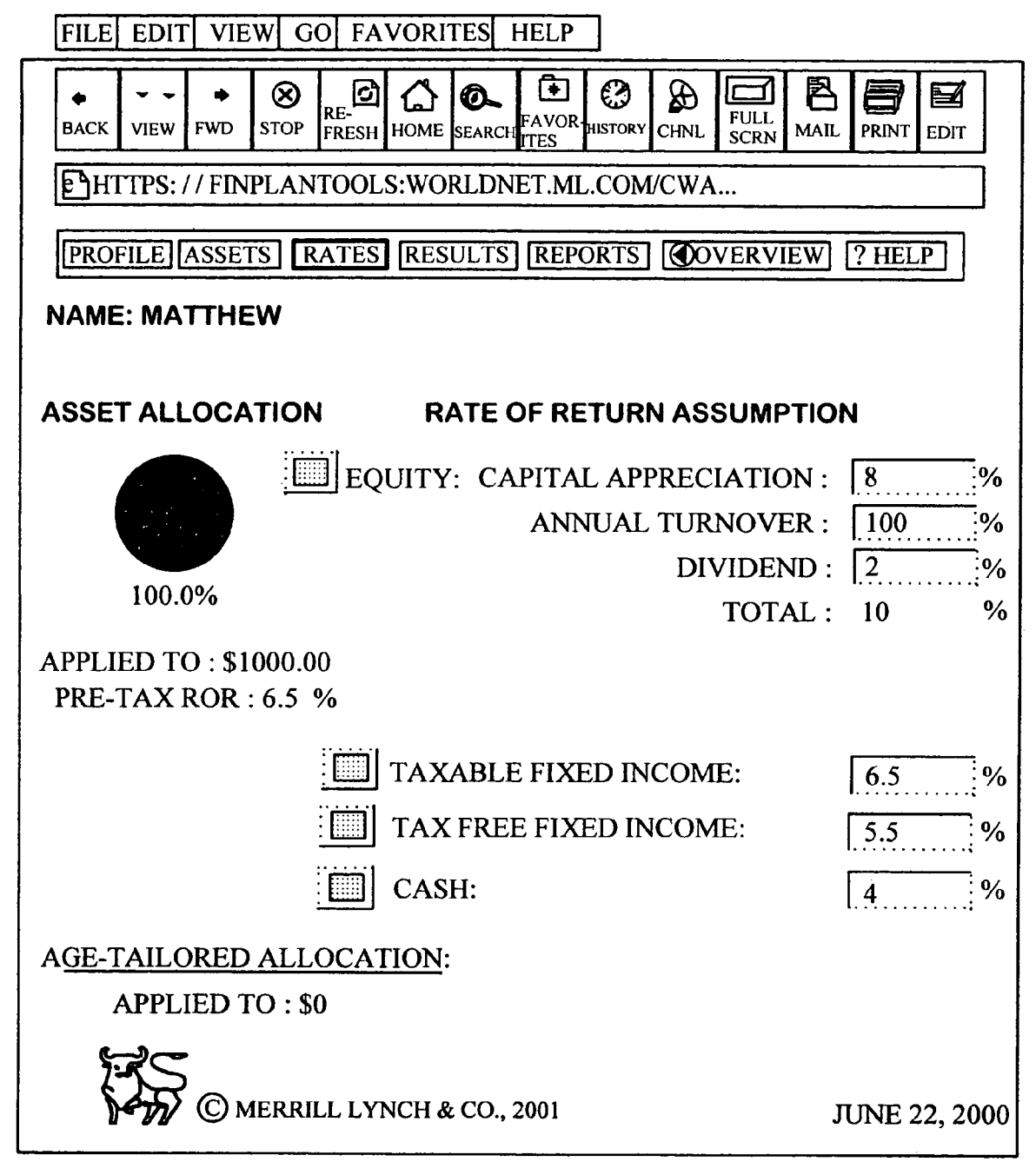

FIG. 17 is a display screen capture on which various assumptions about rates of return may be entered and/or estimated. In this example, capital appreciation is 8%, annual turnover is 100%, and dividends are 2%.

Figure 18:
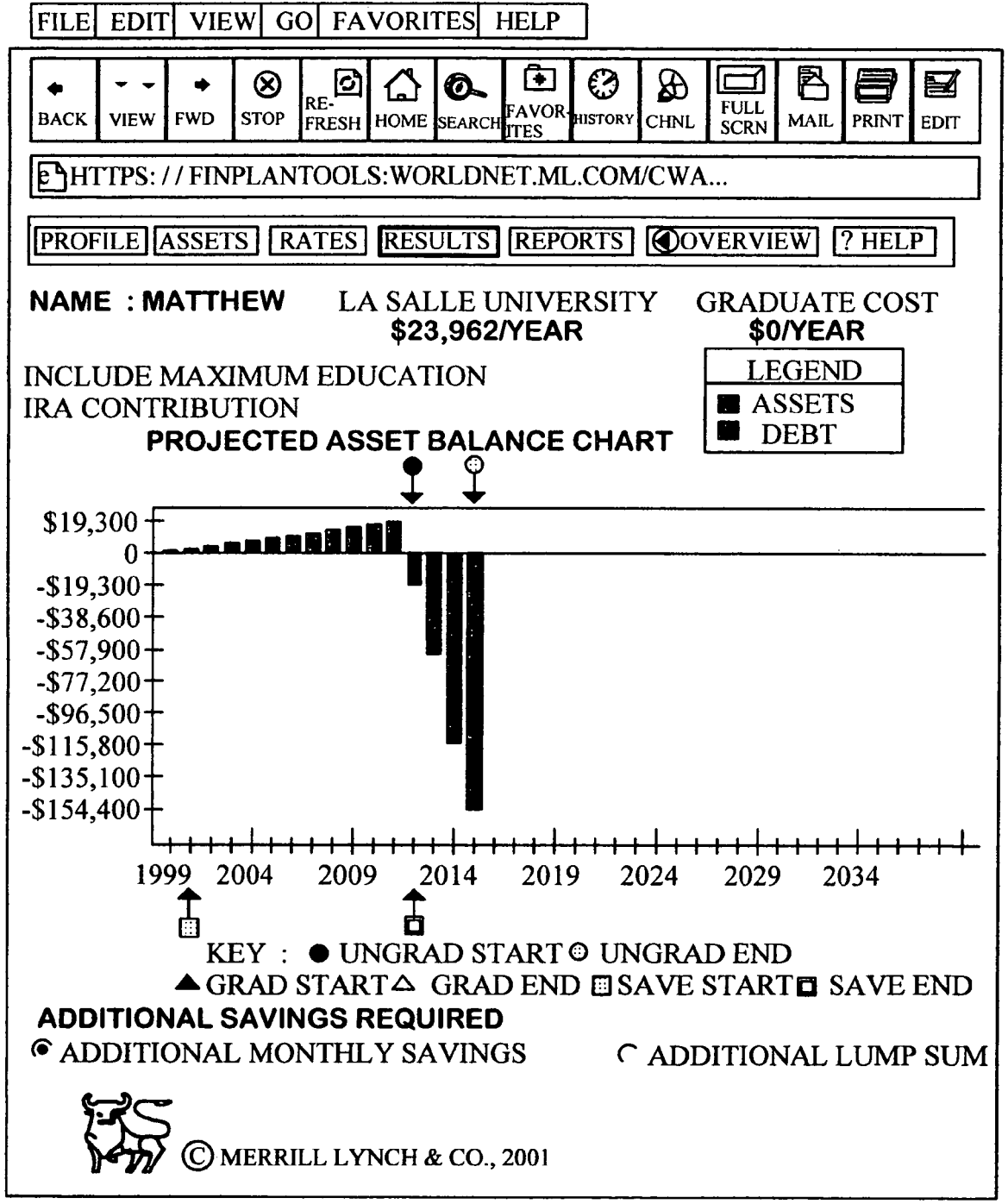
FIG. 18 is a display screen capture that shows the results of the educational savings plan analysis generated by the output mechanism pursuant to a preferred embodiment of the invention.

FIG. 18 is a display screen capture that shows the results of the educational savings plan analysis generated by the output mechanism pursuant to a preferred embodiment of the invention. The graphical output of FIG. 18 shows annual assets in dollars for each of a plurality of years, starting at the commencement of the educational savings plan and ending with graduation. The height of each bar in the bar graph is proportional to the amount of assets in the educational savings plan during a specific year. Note that the assets steadily increase, year by year, once the plan is commenced. However, once the student starts attending college, the assets are eventually depleted.

Figure 19:
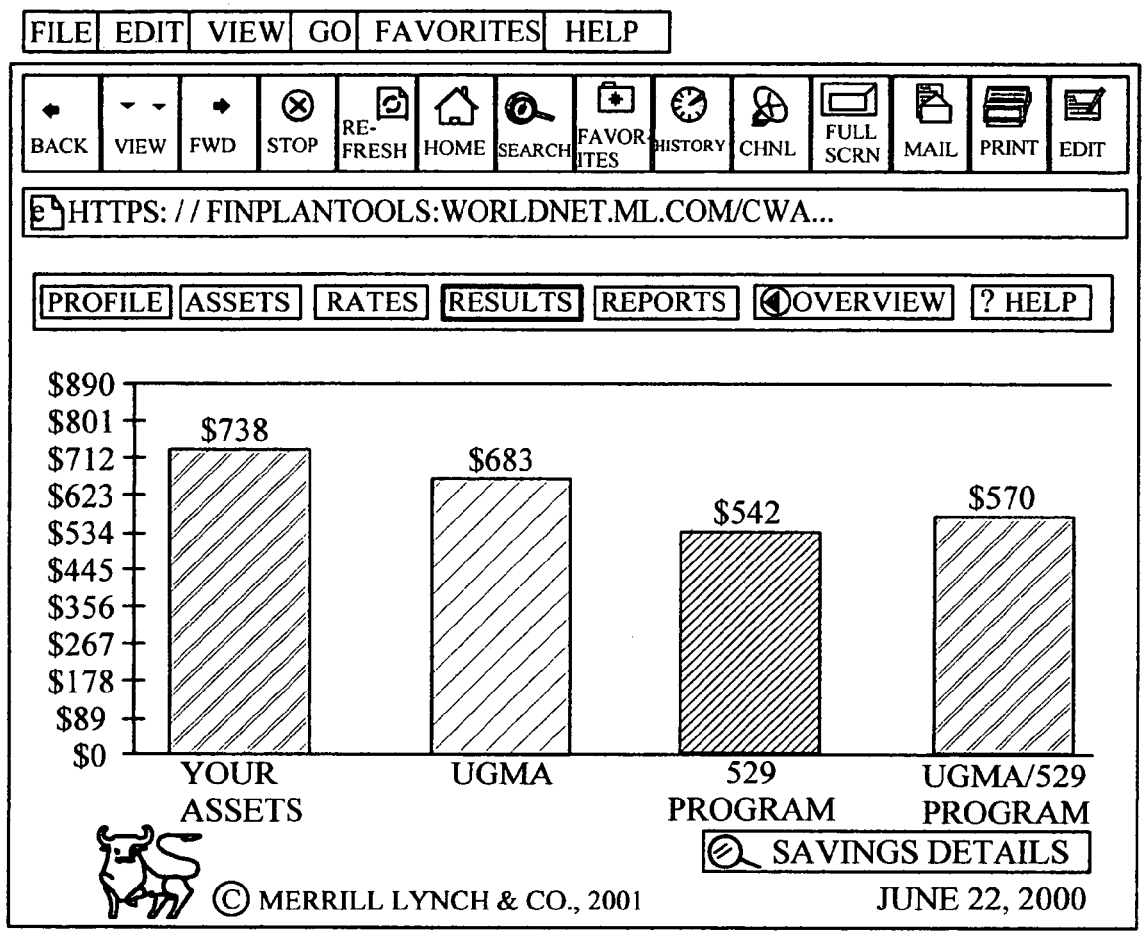
FIG. 19 is a display screen capture that shows a comparison among a plurality of different educational savings plans.

FIG. 19 is a display screen capture that shows a comparison among a plurality of different educational savings plans, with reference to the accumulation of additional monthly savings. In this example, to accumulate sufficient assets to fund the desired educational program, the investor would need to save $141 per month in "personal" assets, $127 per month under a UGMA plan, $149 per month under a Section 529 Plan, and $132 per month if a combination of a Section 529 Plan and a UGMA is used.

Figure 20:
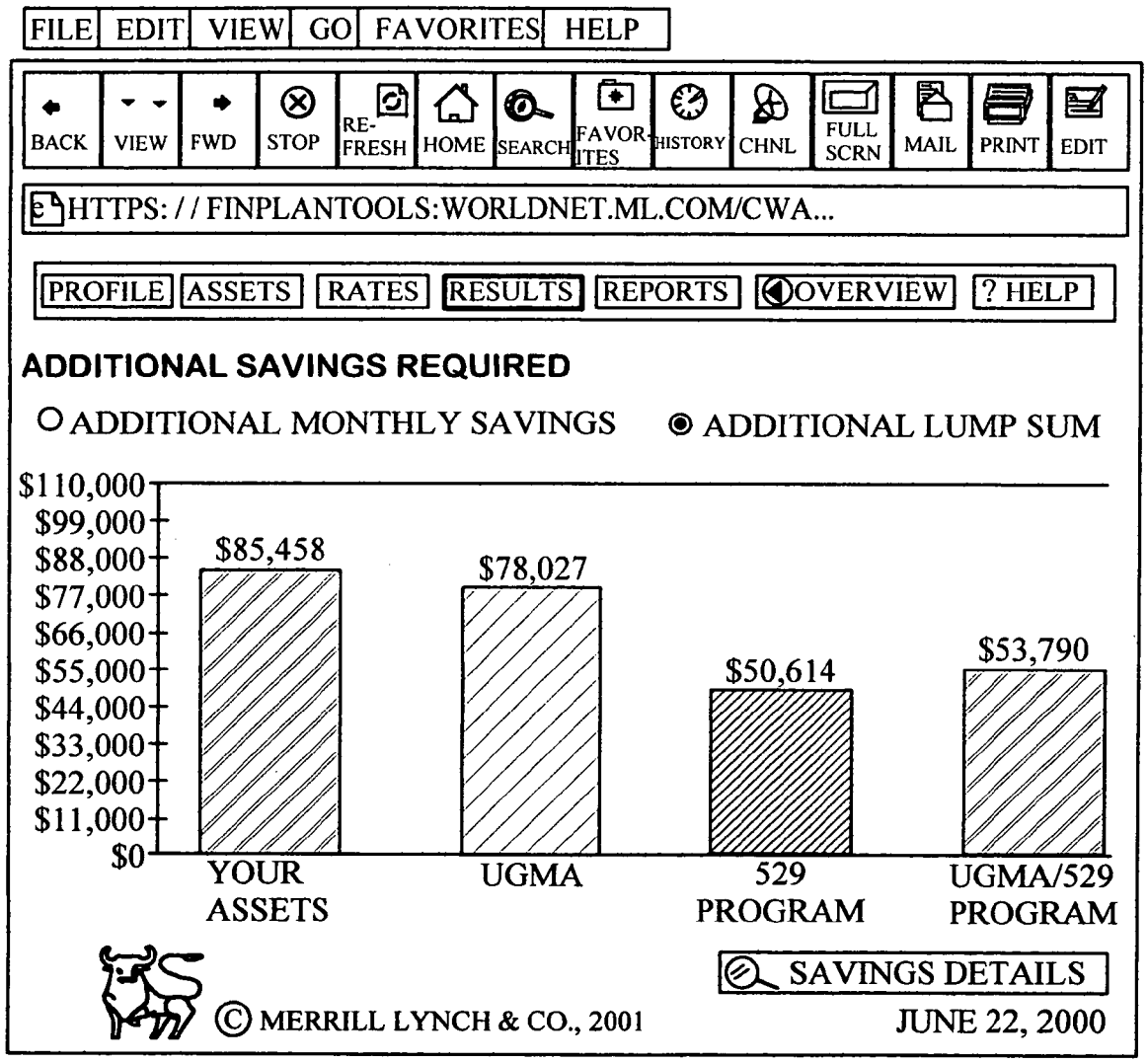
FIG. 20 is a display screen capture that shows a comparison among a plurality of different educational savings plans, taking into account additional lump sum savings.

FIG. 20 is a display screen capture that shows a comparison among a plurality of different educational savings plans, taking into account additional lump sum savings. If the investor placed assets into "personal" accounts, an additional lump sum savings of $14,587 would be required. For a UGMA account, this amount would be reduced to $12,561. For a Section 529 Plan, the amount is $15,055, and for a UGMA/Section 529 Plan combination, the amount is $12,561.

Figure 21:
FIG. 21 is a display screen capture showing the results of the educational savings plan analysis in the form of a year-by-year table that displays the funds invested in the investor's assets, UGMA plan assets, 529 plan assets, and Educational IRA assets.

FIG. 21 is a display screen capture showing the results of the educational savings plan analysis in the form of a year-by-year table that displays the investor's assets, UGMA plan assets, 529 plan assets, and Educational IRA assets. Savings details are provided in tabular form, comparing assets in each of these plans on a year-by-year basis.

FIG. 22 is a display screen capture that provides explanatory textual information to the investor about the results of the educational savings plan analysis.

Figure 23:
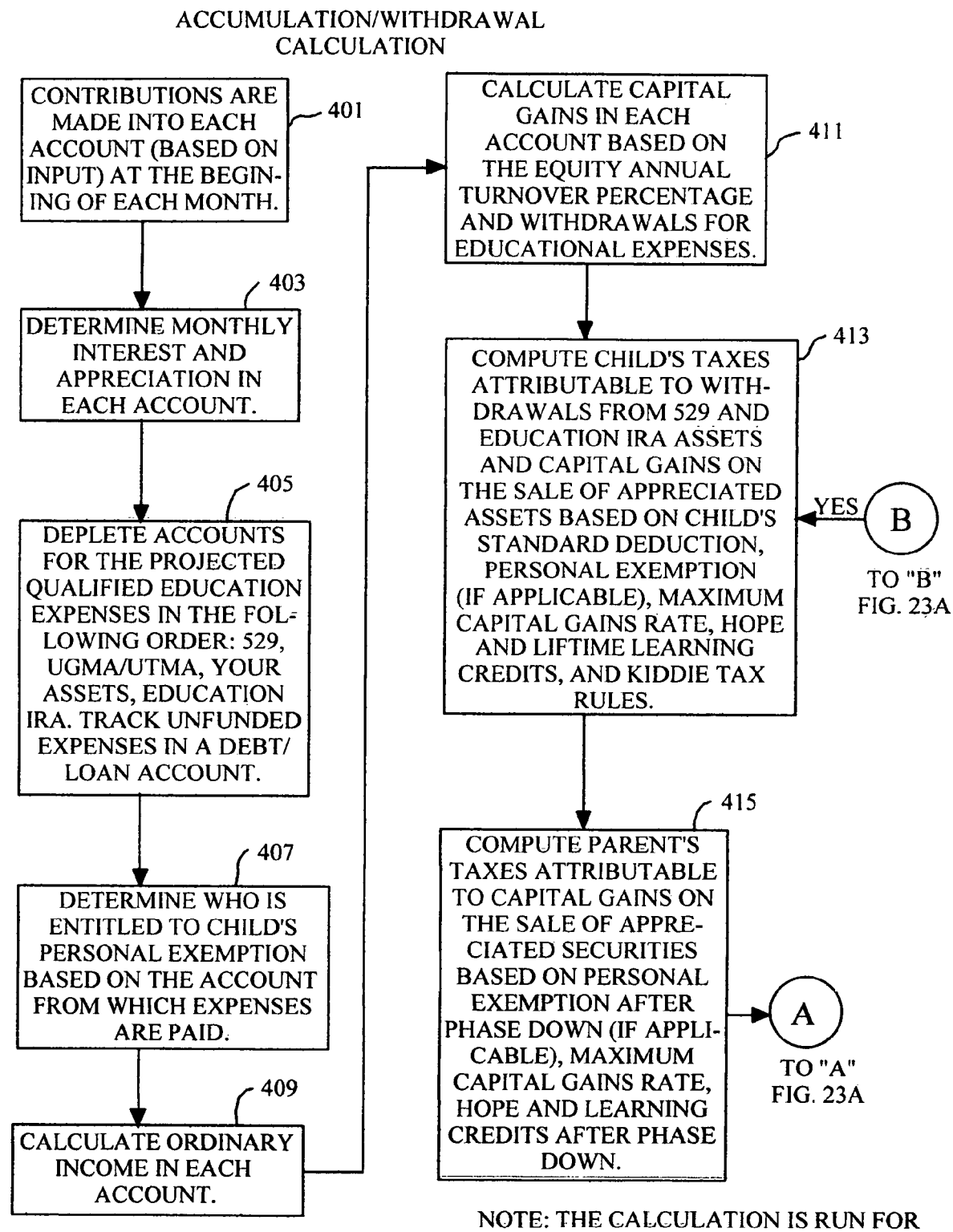
FIG. 23 is a flowchart setting forth an operational sequence for performing educational savings plan accumulation and withdrawal calculations according to a preferred embodiment of the invention.
Figure 23A:
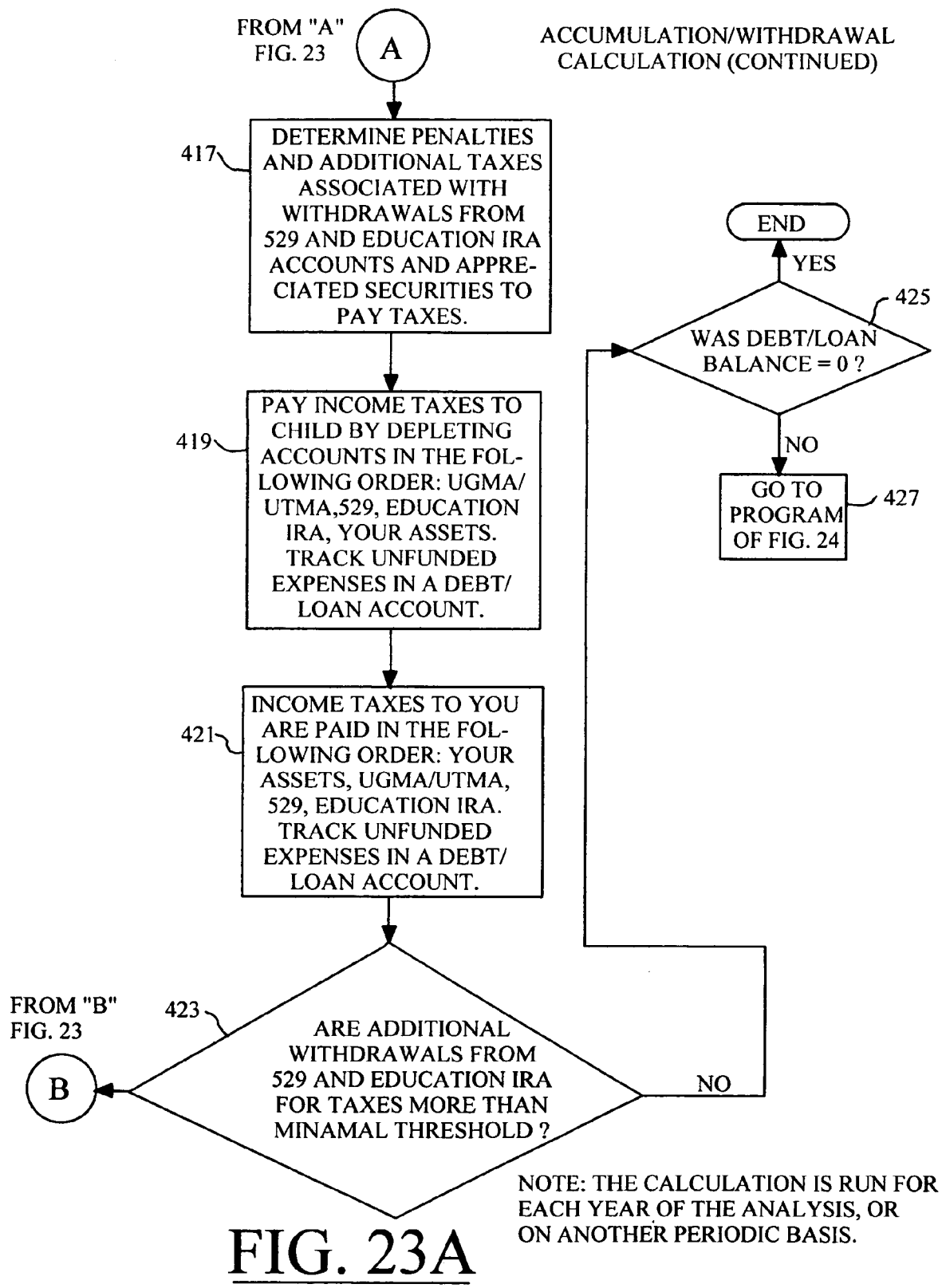

FIG. 23 is a flowchart setting forth an operational sequence for performing educational savings plan accumulation and withdrawal calculations according to a preferred embodiment of the invention. The sequence commences at block 401 where, based upon user input, the program determines the projected financial contributions that are to be made to each of one or more college savings accounts on a periodic basis. Typically, these financial contributions are projected as occurring at the beginning of every month. Next, the program determines the monthly interest and appreciation in each of the accounts (block 403). In order to meet the projected qualified educational expenses, each of the accounts is depleted in a certain rank order. The first account to be depleted is the '529 plan, followed by UGMA/UTMA assets, then client (parent/student/caregiver) assets, and, finally, Education IRA's. Unfunded expenses are tracked in a debt/loan account (block 405).

At block 407, a determination is made as to which party (i.e., parent/caregiver or prospective student/child) is entitled to the student/child's personal exemption. This determination is based upon the account from which expenses are paid. Ordinary income for each account is calculated (block 409), and capital gains for each account is also calculated (block 411). The capital gains calculation is based upon the equity annual turnover percentage and withdrawals for educational expenses. The child/student's taxes attributable to withdrawals from '529 Plan and Educational IRA assets, as well as capital gains on the sale of appreciated assets, are calculated (block 413). These calculations are based upon the child/student's standard deduction, personal exemption (if applicable), maximum capital gain rate, Hope and Lifetime Learning Credits, and Kiddie Tax rules.

The parent/caregiver's taxes attributable to capital gains on the sale of appreciated securities is calculated (block 415). This calculation is based upon personal exemption after phase-down (if applicable), maximum capital gains rate, and Hope and Lifetime Learning Credits after phase-down. Any additional penalties and/or additional taxes are considered at block 417. These additional penalties are associated with withdrawals from '529 Plans, withdrawals from Education IRA accounts, and/or the use of appreciated securities to pay taxes. At block 419, the payment of the child/student's income tax is projected by depleting the accounts in the following order: client assets, UGMA/UTMA assets, '529 Plan assets, and Education IRA assets. Unfunded expenses are tracked in a debt/loan account.

Figure 24:
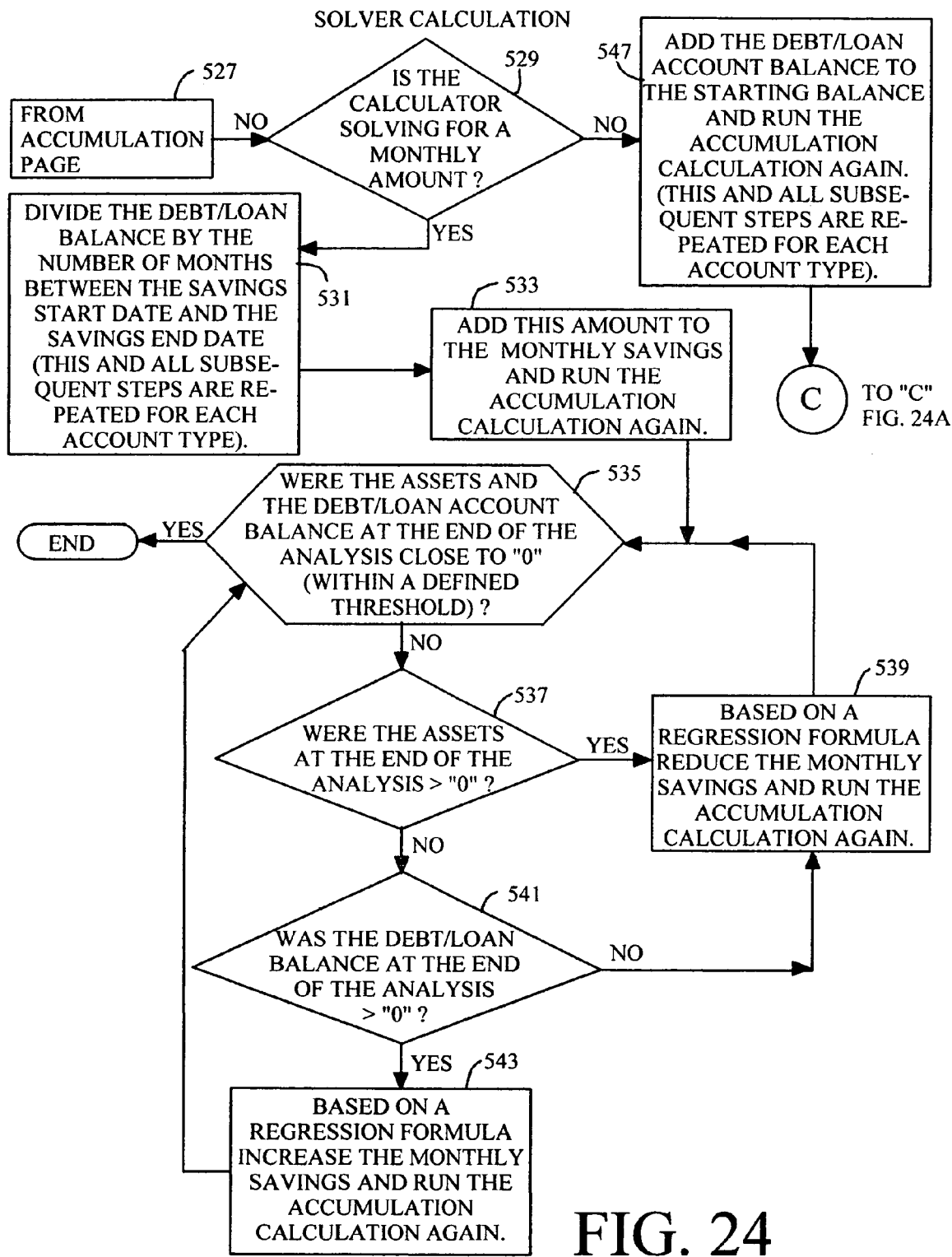
FIG. 24 is a flowchart setting forth an operational sequence for determining an educational savings plan solution according to a preferred embodiment of the invention; and Appendix "A" is an illustrative Report generated in conjunction with the procedures of the present invention.
Figure 24A:
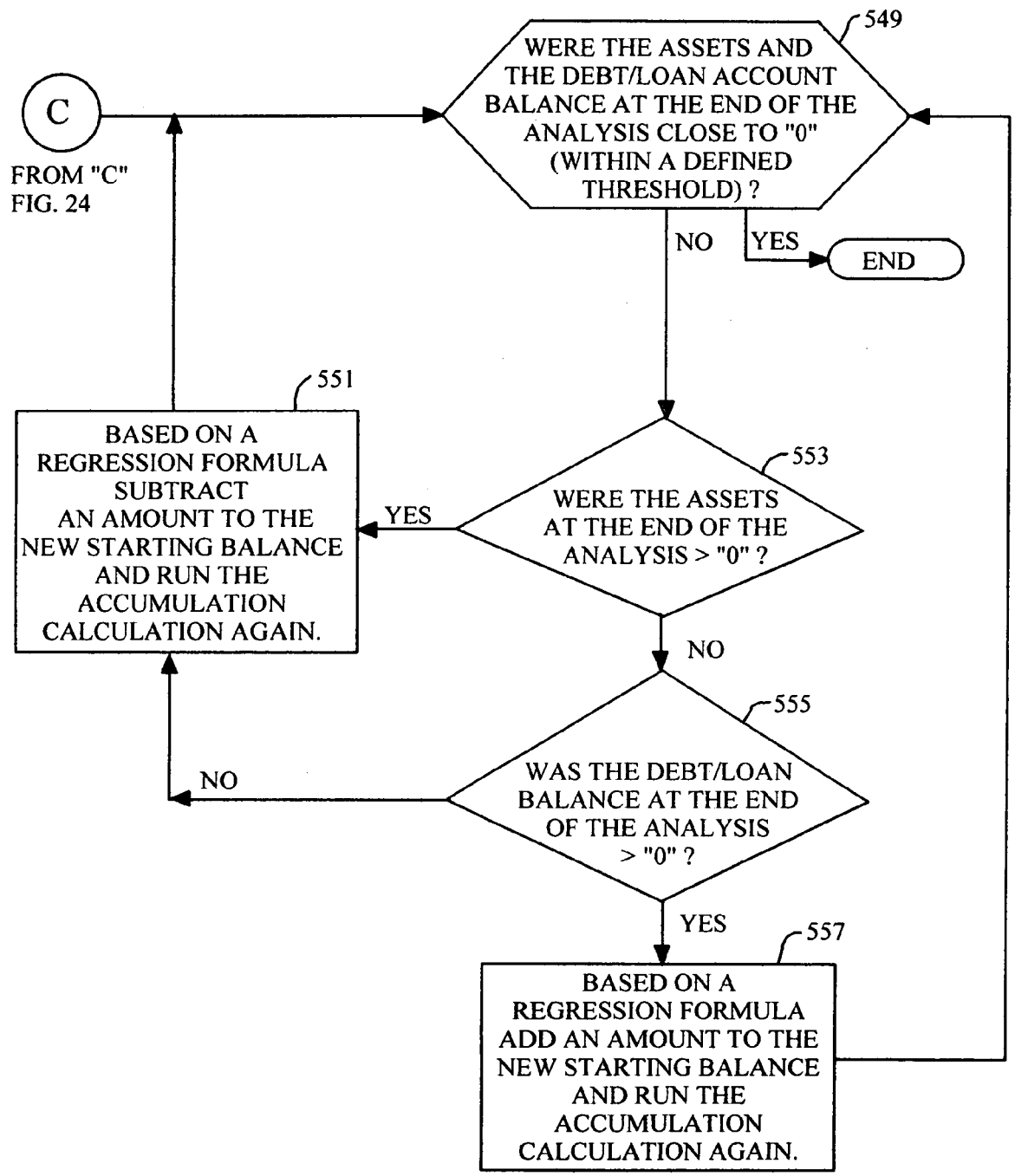

A test is performed at block 423 to ascertain whether or not additional withdrawals from '529 Plans (and/or additional withdrawals from Education IRAs) to meet tax expenses are more than a minimal threshold. If so, the program loops back to block 413. If not, the program advances to block 425 where a test is performed to determine whether or not the debt/loan balance is zero. If so, the program ends. If not, the negative branch leads to block 427 where the program of FIG. 24 is then performed.

Note that the operational sequence of FIG. 23 is repeated for each year to be considered in a projected educational expense analysis. For example, if the child/student will enter high school in September, 2004, the operational sequence of FIG. 23 would be performed once for each of the years 2000, 2001, 2002, 2003, 2004, 2005, 2006, 2007, 2008, 2009, 2010, 2011, and 2012 (assuming that the student plans on graduating from college in 2012). These are projected calculations, and it is expected that calculations for each of these years would be performed simultaneously, in quick succession, and/or substantially in real time, in response to user input. The user would receive the results for every year of the analysis within seconds. That is to say, a calculation that considers the year 2008 does not need to be performed during 2008, unless the user requests a projected analysis at that time FIG. 24 is a flowchart setting forth an operational sequence for determining an educational savings plan solution according to a preferred embodiment of the invention. This procedure may be referred to as a "solver calculation". The procedure commences at block 527, which is accessed from block 427 of FIG. 23. From block 527, the program progresses to block 529 where a test is performed to ascertain whether or not the solver calculation is solving for a monthly amount. If so, the program branches to the operational sequences of blocks 531-543. If not, the program branches to the operational sequences of blocks 547-557.

If the solver calculation is for a monthly amount, at block 531, the debt/loan balance is divided by the number of months between the savings starting date and the savings ending date. This step (and the steps of blocks 533-543 as well) are repeated once for each account type and/or plan represented in a user's overall educational savings program. The amount determined at block 531 is added to the monthly savings, and the accumulation calculation (i.e., the procedure of FIG. 23) is performed once again. Program control then returns to block 535 where a test is performed to ascertain whether or not the assets and the debt/loan account balance at the end of the analysis period were both close to zero (within a pre-defined threshold). If so, the program ends. If not, program control progresses to block 537 where a test is performed to determine whether or not the assets at the end of the analysis period were greater than zero (or greater than within a predetermined threshold of zero). If so, program control progresses to block 539 where, based on a regression formula, the amount of monthly savings is reduced, the accumulation program of FIG. 23 is executed again, and, after this execution, the program loops back to block 535.

The negative branch from block 537 leads to block 541 where a test is performed to ascertain whether or not the debt/loan balance at the end of the analysis period was greater than zero (or greater than within a predetermined threshold of zero). If not, the program ends. If so, the program progresses to block 543 where, based upon a regression formula, the amount of monthly savings is increased, the accumulation calculation of FIG. 23 is executed again, and, after execution, program control returns to block 535.

The operational sequence of blocks 547-557 will be performed as the negative branch leading from block 529. At block 547, the debt/loan account balance is added to the starting balance, and the accumulation program of FIG. 23 is executed again. (This step, as well as the steps of blocks 549-557, are repeated once for each account/plan type in a user's overall educational investment program.) After execution of the program of FIG. 23, program control returns to block 549 where a test is performed to ascertain whether or not the assets and the debt/loan balance at the end of the analysis period were both close to zero (i.e., within a pre-defined threshold of zero). If so, the program ends. If not, program control progresses to block 553 where a test is performed to ascertain whether or not the assets at the end of the analysis were greater than zero (or greater than zero by at least a predetermined threshold). If so, the program advances to block 551 where, based upon a regression formula, an amount is subtracted from the new starting balance, the accumulation calculation of FIG. 23 is executed again, and, after execution, program control reverts back to block 549. If the assets at the end of the analysis were not greater than zero (or greater than zero by at least a predetermined threshold), then the program advances to block 555 where a test is performed to ascertain whether or not the debt/loan balance at the end of the analysis period was greater than zero (or greater than zero by at least a predetermined threshold). If not, the program ends. If so, the program advances to block 557 where, based upon a regression formula, an amount is added to the new starting balance, the accumulation program of FIG. 23 is executed again and, after execution, program control reverts back to block 549.

Appendix "A" is an illustrative Report generated in conjunction with the procedures of the present invention. Illustratively, this Report may be produced by printer 120 (FIG. 1). It is also possible to furnish this Report in the form of a graphical output supplied to a display device, such as a CRT or LCD screen coupled to a computing device.

While the preferred embodiments of the present invention have been described in detail, it will be appreciated that numerous variations and modifications of the present invention will occur to persons skilled in the art. All such variations and modifications shall constitute the present invention as defined by the scope and spirit of the appended claims.

We claim:

1. A computerized method for analyzing college savings plans, the method for use with a computer-readable medium on which are stored a plurality of educational institution identifiers and a plurality of educational savings plan parameter sets, each of respective educational institution identifiers being associated with a corresponding cost parameter set specifying at least one of room, board, and tuition costs for the respective educational institution; each of the plurality of educational savings plan parameters specifying one or more financial characteristics of a corresponding educational savings plan; the method comprising the steps of:
   a. receiving at least one educational institution identifier;
   b. for each of the educational institution identifiers received in step (a), retrieving the corresponding cost parameter set from the computer-readable medium;
   c. generating, by a computer, a comparative analysis of a plurality of educational savings plans by (i) applying each of the retrieved cost parameter sets of step (b) to each of the plurality of educational savings plan parameters; and (ii) applying one or more tax considerations for at least one of the educational savings plans, wherein at least one of said plurality of educational savings plans comprises an account of funds and said tax considerations comprise taxing withdrawal of said funds from said account at a first rate when said withdrawal is used for a non-educational expense and at a second rate less than said first rate when said withdrawal is used for an educational expense; and
   d. outputting a report of the comparative analysis, the report presenting an amount of assets in at least one of the educational savings plans for each year of a savings period.

2. The computerized method of claim 1 wherein the step of generating a comparative analysis further includes comparing each of a plurality of educational savings plans with reference to one or more specific asset allocations.

3. The computerized method of claim 1 wherein the step of generating a comparative analysis further includes a comparison based upon tax considerations.

4. The computerized method of claim 1, wherein at least one of said plurality of educational savings plans comprises an account of funds and a child beneficiary, wherein said tax considerations comprise taxing investment income on said funds at a child beneficiary rate.

5. The computerized method of claim 1, wherein generating a comparative analysis of a plurality of educational savings plans comprises computing monthly savings needed under each of said plurality of educational savings plans, wherein said report of said comparative analysis comprises an indication of said monthly savings needed under each of said plurality of educational savings plans.

6. The computerized method of claim 1, wherein generating a comparative analysis of a plurality of educational savings plans comprises computing a lump sum saving needed under each of said plurality of educational savings plans, wherein said report of said comparative analysis comprises an indication of said lump sum savings needed under each of said plurality of educational savings plans.

7. A system for analyzing college savings plans, the system comprising:
   a. a computer-readable medium on which are stored a plurality of educational institution identifiers and a plurality of educational savings plan parameter sets, each of respective educational institution identifiers being associated with a corresponding cost parameter set specifying at least one or room, board, and tuition costs for the respective educational institution; each of the plurality of educational savings plan parameters specifying one or more financial characteristics of a corresponding educational savings plan;
   b. an input mechanism for receiving at least one educational institution identifier;
   c. a data retrieval mechanism for retrieving a corresponding cost parameter set from the computer-readable medium in response to the input mechanism receiving an educational identifier;
   d. a comparative analysis generation mechanism for generating a comparative analysis of a plurality of educational savings plans by (i) applying the retrieved cost parameter set to each of the plurality of educational savings plan parameters; and (ii) applying one or more tax considerations for at least one of the educational savings plans, wherein at least one of said plurality of educational savings plans comprises an account of funds and a child beneficiary, and said tax considerations comprise taxing withdrawal of said funds from said account at a first rate when said withdrawal is used for a non-educational expense and at a second rate less than said first rate when said withdrawal is used for educational expense; and
   e. an output mechanism for outputting a report of the comparative analysis, the report presenting an amount of assets in at least one of the educational savings plans for each year of a savings period.

8. The system of claim 7 wherein the comparative analysis generation mechanism compares each of a plurality of educational savings plans with reference to one or more specific asset allocations.

9. The system of claim 7 wherein the comparative analysis generation mechanism further includes a comparison based upon tax considerations.

10. The system of claim 7, wherein at least one of said plurality of educational savings plans comprises an account of funds and a child beneficiary, wherein said tax considerations comprise taxing investment income on said funds at a child beneficiary rate.

11. The system of claim 7, wherein said comparative analysis generation mechanism computes monthly savings needed under each of said plurality of educational savings plans, wherein said report of said comparative analysis comprises an indication of said monthly savings needed under each of said plurality of educational savings plans.

12. The system of claim 7, wherein said comparative analysis generation mechanism computes a lump sum saving needed under each of said plurality of educational savings plans, wherein said report of said comparative analysis comprises an indication of said lump sum savings needed under each of said plurality of educational savings plans.

* * * * *